United States Patent

Nadir et al.

[15] 3,646,274

[45] Feb. 29, 1972

[54] ADAPTIVE SYSTEM FOR INFORMATION EXCHANGE

[72] Inventors: Mark T. Nadir, Warren; Carl N. Abramson, South Boundbrook, both of N.J.

[73] Assignee: Adaptive Technology, Inc., Piscataway, N.J.

[22] Filed: Sept. 29, 1969

[21] Appl. No.: 861,947

[52] U.S. Cl. ....................179/15 BA, 179/15 AL, 179/15 BY

[51] Int. Cl. ....................H04j 3/00

[58] Field of Search ............179/15 A, 15 BA, 15 AP, 15 BY, 179/15 BC, 2 A, 2 AS, 15 AW

[56] References Cited

UNITED STATES PATENTS

| | | | |
|---|---|---|---|
| 2,920,143 | 1/1960 | Filipowski | 179/15 BA |
| 3,123,672 | 3/1964 | Ross | 179/1.5 R |
| 3,340,366 | 9/1967 | Bovr et al. | 179/15 BA |
| 3,422,226 | 1/1969 | Acs | 179/15 BA |
| 3,458,661 | 7/1969 | Forde et al. | 179/15 AL |
| 3,519,750 | 7/1970 | Beresin et al. | 179/15 AL |
| 3,530,459 | 9/1970 | Chatelon | 179/15 BY |

*Primary Examiner*—Kathleen H. Claffy
*Assistant Examiner*—David L. Stewart
*Attorney*—Kenyon & Kenyon Reilly Carr & Chapin

[57] ABSTRACT

A distributed-control multiplex system is disclosed in which individual discrete subperiods within a repetitive period are assigned respective words or message meanings from the system vocabulary. Information transfer between stations occurs by inserting into the subperiod assigned to the desired word or meaning to be transmitted the address of the receiving and/or sending station.

64 Claims, 27 Drawing Figures

Patented Feb. 29, 1972 3,646,274

16 Sheets-Sheet 1

INVENTORS
MARK T. NADIR
CARL N. ABRAMSON
BY Kenyon & Kenyon
ATTORNEYS

INVENTORS
MARK T. NADIR
CARL N. ABRAMSON
BY
Kenyon & Kenyon
ATTORNEYS

INVENTORS
MARK T. NADIR
BY CARL N. ABRAMSON
Kenyon & Kenyon
ATTORNEYS

INVENTORS
MARK T. NADIR
CARL N. ABRAMSON
BY Kenyon & Kenyon
ATTORNEYS

INVENTORS
MARK T. NADIR
CARL N. ABRAMSON
BY Kenyon & Kenyon
ATTORNEYS

INVENTORS
MARK T. NADIR
CARL N. ABRAMSON
BY
Kenyon & Kenyon
ATTORNEYS

INVENTORS
MARK T. NADIR
CARL N. ABRAMSON
BY
Kenyon & Kenyon
ATTORNEYS

INVENTORS
MARK T. NADIR
CARL N. ABRAMSON
BY Kenyon & Kenyon
ATTORNEYS

INVENTORS
MARK T. NADIR
CARL N. ABRAMSON
BY Kenyon & Kenyon
ATTORNEYS

INVENTORS
MARK T. NADIR
CARL N. ABRAMSON

BY Kenyon & Kenyon
ATTORNEYS

INVENTORS
MARK T. NADIR
CARL N. ABRAMSON
BY Kenyon & Kenyon
ATTORNEYS

INVENTORS
MARK T. NADIR
CARL H. ABRAMSON
BY Kenyon & Kenyon
ATTORNEYS

INVENTORS
MARK T. NADIR
CARL N. ABRAMSON

BY

Kenyon & Kenyon
ATTORNEYS

INVENTORS
MARK T. NADIR
CARL N. ABRAMSON
BY Kenyon & Kenyon
ATTORNEYS

INVENTORS
MARK T. NADIR
CARL N. ABRAMSON
BY Kenyon & Kenyon
ATTORNEYS

INVENTORS
MARK T. NADIR
CARL N. ABRAMSON
BY
Kenyon & Kenyon
ATTORNEYS

ADAPTIVE SYSTEM FOR INFORMATION EXCHANGE

BACKGROUND OF THE INVENTION

Information exchange in the present commercial state of the electrical arts involves such well-known instrumentalities as telephone and telegraph systems, radio and television transmitters and receivers, teletypewriters, computers, and data transmitters and receivers of many kinds. Any of these may be linked in various ways to exchange information, for example, by wires, cables or electromagnetic (radio or television) waves. The information may be in many "languages," for example: that of the human voice, that of written alphabets and common words, those of many technological or business accounting arts, as engineering or accounting data of all kinds, or the mathematical language of the modern computer.

In the present state of the electrical arts, systems for information exchange employing the foregoing instrumentalities become exceedingly complex because of their basic design concepts. These systems often require the use of highly complex switching systems to set up channels of communication between sending and receiving stations. For example, where telephone lines are set up to interconnect any of the foregoing voice, teletypewriter or computer instrumentalities, complex switching arrangements are required to establish the interconnection and to measure its duration in time for purposes of billing the cost to the customer. Even such sophisticated techniques as time division multiplex (TDM) or frequency division multiplex, and similar techniques designed to increase efficiency by increasing the number of message channels available, do not avoid these disadvantages, and in fact further complicate them. Moreover, some can handle only a limited number of users.

A resulting disadvantage of these present commercial systems is attributable to the manner in which time is put to use. If, as with the present telephone system, the system is designed such that the interconnection between originator and receptor stations must be maintained so long as the communicating locations wish to communicate, much time is wasted in setting up the interconnection or when the locations are not actually communicating, as when conversing people pause during a conversation. If this unused wasted time could be made available for use by other stations desiring to communicate, a considerable improvement in economic efficiency could be obtained. This is always important where cost of communication is measured by the time duration of the interconnection between originator and receptor stations. While systems such as TASI (TIME ASSIGNED SWITCHING) have been devised to make the unused wasted time due to pauses during conversation available for use by others, such systems are expensive and complicated and permit entry only of relatively large blocks of information.

The foregoing present commercial techniques may be said to reserve or monopolize for use time periods of variable duration during which the originator station sends voice or code-modulated waves carrying the information exchange.

SUMMARY OR OUTLINE OF THE INVENTION

One feature of the invention is the use of subperiods of time occurring in recurrent periodic groups, the subperiods being synchronously related at the stations and individually assigned with message meanings (words, letters, numbers, or data of any kind) known to the stations. Information is exchanged by sending during selected such subperiods signals identifying an originator and/or receptor station so that a receptor station may, in response to such signals, derive the message meanings simply by correlating the so selected subperiods with their assigned message meanings. Thus the signals identify not only the assigned message meaning by occurring in the proper time period, but also identify the originator and/or receptor station. The only information flowing over the transmission path is that of these originator and/or receptor station identifying signals (SI).

One might characterize the distinctions from present conventional techniques this way: Present systems use time only as a kind of channel during which a message conveying medium e.g., a voice, or code-modulated electrical carrier current or wave) is in actual flow from the originator to the receptor at all points along the transmission path. By contrast, the invention uses, as the message conveying medium, distinct time periods recognizable by originator and receptor, and the originator signals messages to the receiver by advising the receptor which time periods to examine for assigned message meaning. Nothing flows along the transmission path but the identifying signal (SI) of the originator or the receptor station, and that signal has meaning only because of the exact timing of its sending or arrival. The internal system machinery directs that signal to its intended destination where it is selected and detected. Thus, with this invention, the message conveying medium flowing along the transmission path is in the form of displacements of the subperiod identifying signals (SI) in time. Stated otherwise, the originator conveys messages sages in the single step of tagging distinct time subperiods rather than the present commercial two-step technique of first establishing a channel to send a message and then sending a message through the channel. The distinct time tag of the invention is used not only to identify the message text but also to identify the originator or the receptor station. The consequences of these distinctions between present systems and the invention are strikingly significant when one comes to examine the advantages of practical equipment built to implement the invention.

The foregoing inventive concept leads to many advantages of which the following are illustrative:

1. As already indicated, more efficient use of available time with the result that cost of information transmission is lower. In fact, the efficiency in use of available time increases with the number of stations using the system and can be made to approach 95 percent as the number of using stations increases to very large numbers (efficiency being defined as the ratio of time usable by the system to total available time).
2. Conventional switches and routing switching arrangements as well as most bandwidth restricting filters are eliminated and in many other respects equipment is greatly simplified.
3. Since the time now required in present systems for setting up switching arrangements does not exist with the system of the invention, remote control operations are greatly speeded up.
4. The system is more readily accessible to users.

In this respect, users may enter their information into the system and extract information therefrom with greater freedom. Originating users may freely enter their information into the system at any desired time and make it available simultaneously to all receptor users on a nonselective basis, or they may restrict it to selected receptor users.

So called "catastrophic failure" in which a system fails totally on excessive overloads cannot occur with the system of the invention. Rather there is gradual degradation as the load on the system increases.

5. A technique (Z numbers) used to raise the efficiency of the use of time inherently results also in a coding technique which is secret and may be made "unbreakable" by intruders to the system.
6. The system reduces bandwidth requirements, particularly where some information is of such nature that it may be transmitted more slowly than other information.
7. The system inherently includes the feature that communicates between stations cannot be intercepted by other stations for which the exchange of information is not intended.
8. The system provides a novel way of assigning priority to messages of greater or lesser urgency in which priority can be advanced or retarded in time depending on the momentary message load on the system.

9. The system can perform functions present systems cannot perform, and can perform better functions present systems can perform.
10. The bandwidth required by a user may be variable.

The nature of the invention will be understood from the following description of preferred embodiments.

DESCRIPTION OF DRAWINGS

FIGS. 1 through 7 are schematics to illustrate the basic principles of the invention, including various techniques to be used in various practical embodiments illustrated in the following FIGS. The FIGS. 1 to 5 illustrate the use of periods (P) during TEXT TIMES, while FIGS. 6 and 7 illustrate use of periods (P) during both HAND SHAKING TIMES AND TEXT TIMES.

FIG. 8 is a schematic to illustrate in principle how the invention might be employed in a system set up to send a plurality of information originator stations a plurality of receptor stations, each originator station being identified by its characteristic station identifying signal (SI) so that it may be separated from the other originator stations during reception. For example, this might be useful in a system where a number of items of data (items labeled as to source) are to be transmitted from a remote station to a plurality of data recording instrumentalities each of which selects (by source label) a particular data source.

Alternatively FIG. 8 may be arranged so that it is the receptor station identifying signal which is sent so that it may be separated from the signal identifying signals sent to other receptor stations during reception. For example, this might be useful in a system where a number of items of data (items labeled as to destination) are to be transmitted from a central location to a plurality of receptor locations, the central location selecting (by destination label) the receptor location to which any particular data is to go.

FIG. 8 also illustrates a simple Z number operation.

Figure 9:
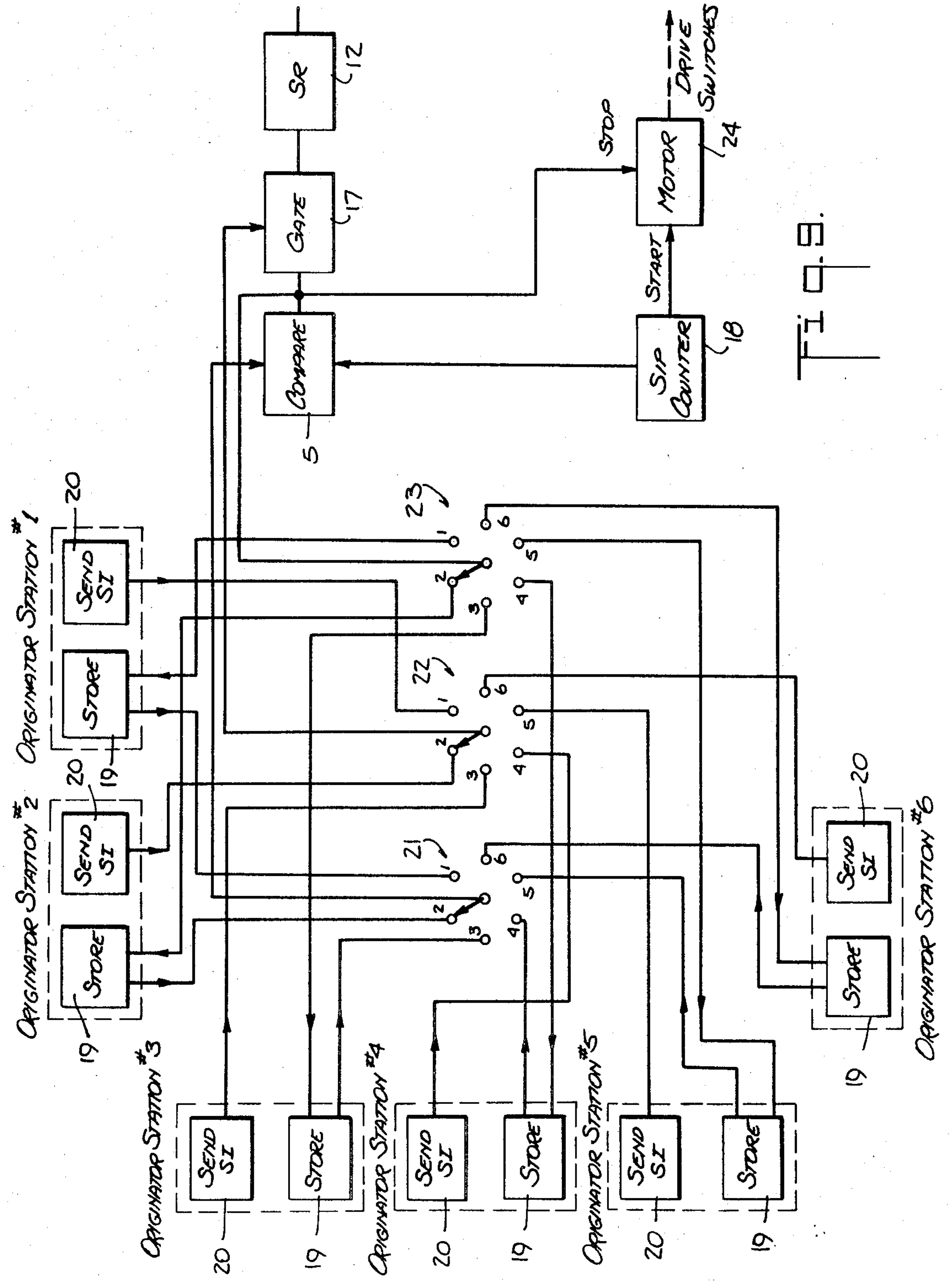
Figure 10:
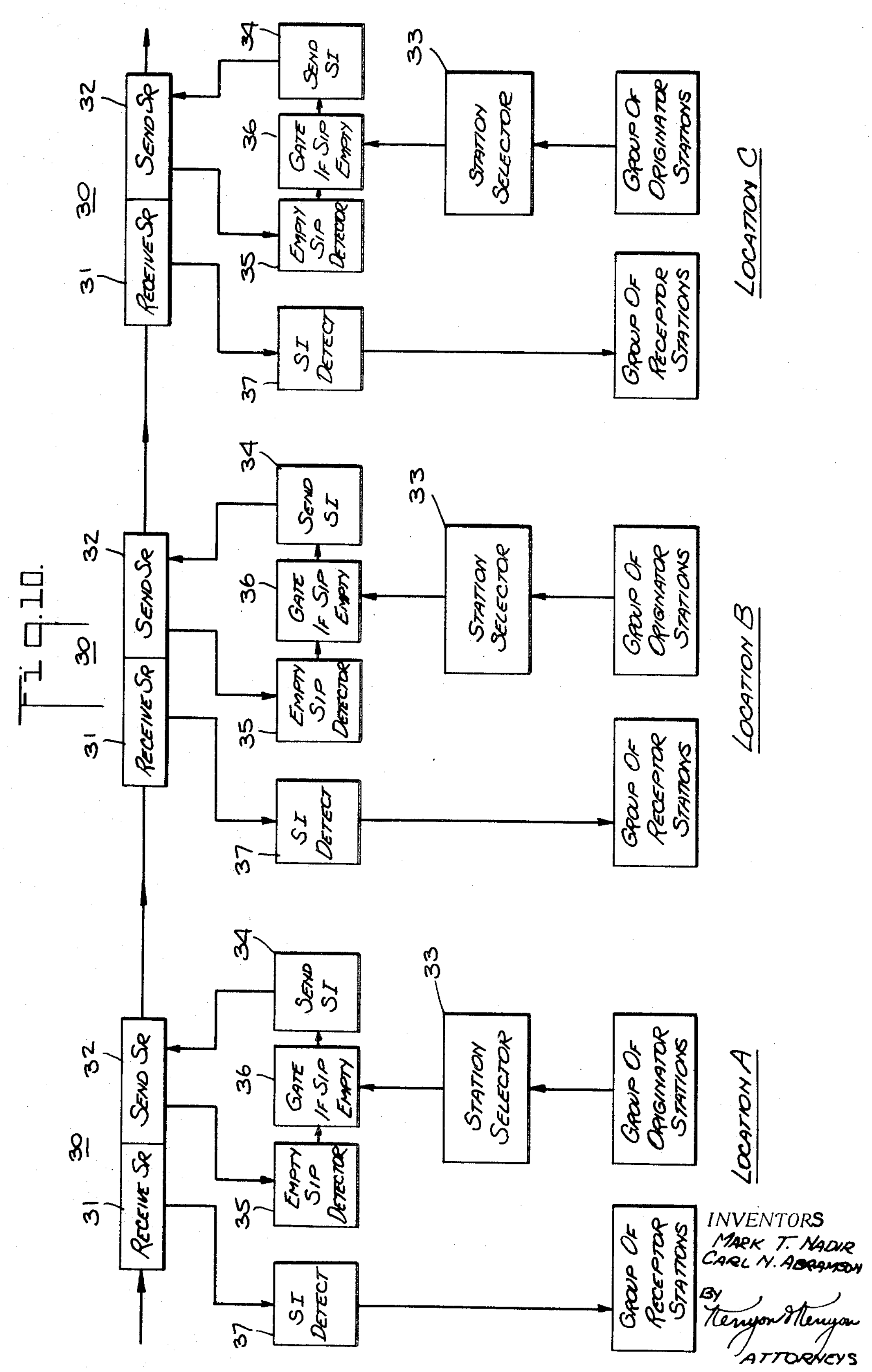

FIG. 9 is a more detailed illustration of how the originator function of FIG. 8 might be implemented in practice to select sending stations;

The remaining FIGS. 10–27 illustrate a two-way communications system.

DESCRIPTION OF PREFERRED EMBODIMENTS

FIGS. 1 to 7 shown time and signal relationships essential to an understanding of the concepts of the invention and apparatus for implementing it. Selected ones of these relationships, but not necessarily all, will be used in the apparatus to be explained later. It will be understood that these FIGS. 1–7 are illustrative of one practical system and that many variations may be used depending on system requirements.

Figures 1, 2, 3, 4, 5:
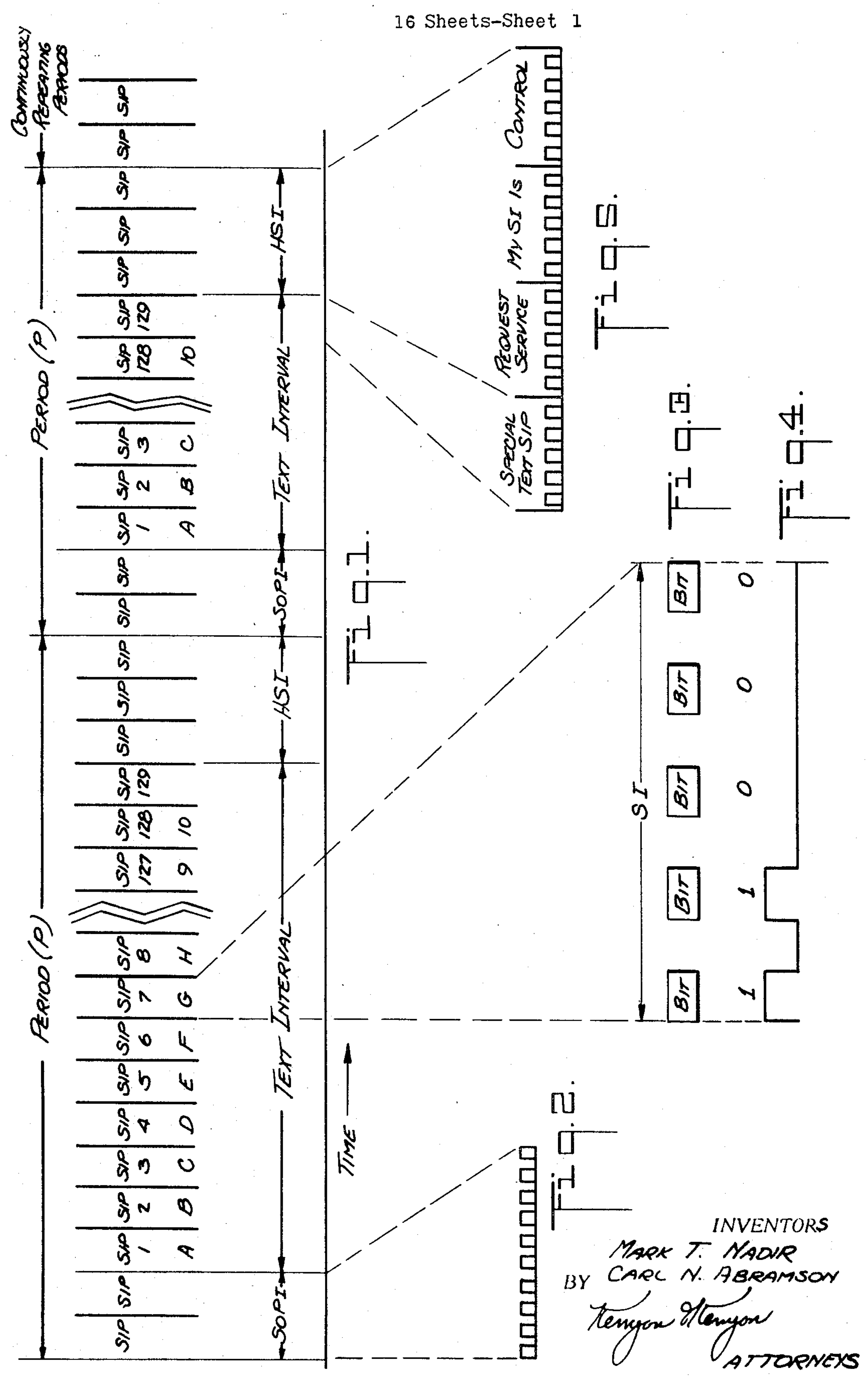
Figure 2:
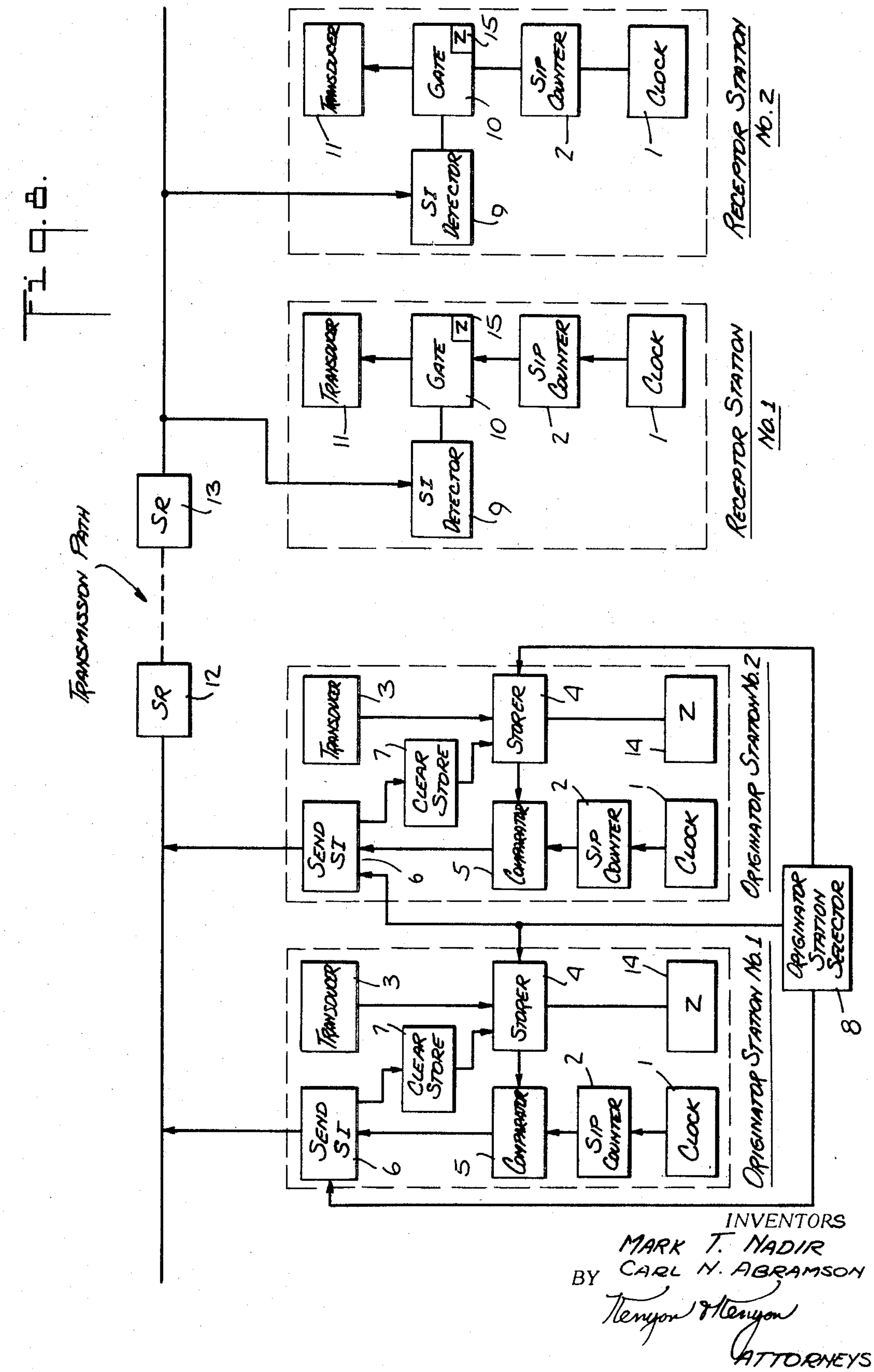

FIG. 1 illustrates two of a plurality of time periods (P) which are continuously repetitive and synchronously related at all stations of the system. All periods P are subdivided into 134 subperiods termed SIP, a term derived from "Station Identifier Period" for reasons which will be clear later. For reasons to be explained later, the subperiods SIP will be grouped into groups designated; "Start of Period Identifier" (SOPI) (comprising 2 SIP): "TEXT INTERVAL" (comprising 129 SIP); and "HAND SHAKING INTERVAL" (comprising 3 SIP), and means will be provided for counting the SIP so that they are synchronously related at all stations.

The term "synchronously related" as used herein does not mean that there is necessarily an exact simultaneity of events at the stations since delays in the system will cause delays as between those events. It does however means that there will be simultaneity at any station in the system as between SI and SIP in which they must occur.

During the SOPI, a signal will be sent to all stations of the system to identify the start of each period P for the purpose of synchronizing equipment which must recognize all periods P. Such a signal is shown in FIG. 2 and may comprises any convenient synchronizing signal such as the series of pulses shown. This signal will have other uses as explained later, such as selecting geographical areas of stations served or various traffic controls by variations in the number and timing of the pulses.

After the SOPI there follows the TEXT INTERVAL comprising a series of text subperiods SIP numbered for counting and designated $SIP_1$, $SIP_2$, $SIP_3$, $SIP_4$,---------$SIP_{129}$ and which are individually assigned at the sending and receiving stations with textual message meanings, for example, the alphabet A, B, C, etc., and decimal numerals ending in 9, 10, as indicated. The alphabetic and numerical characters are illustrated here for simplicity of explanation only, since it is to be understood that many forms of message meanings will ordinarily be needed, for example, any kind of characters or data needed in engineering or business accounting. Thus, while only some of the text interval subperiods $SIP_1$ to $SIP_{128}$ are shown as having alphabetical and numerical meanings, the others will have assigned meanings such as punctuation marks, and other characters needed in common written, teletypewriter, accounting information exchange, or special usage such as is indicated by $SIP_{129}$.

The text interval is used to transmit messages between stations of the system by transmitting during selected ones of the subperiods $SIP_1$ to $SIP_{128}$ signals called SI (for "Station Identifier") which perform the dual function of identifying either the originator station or the receptor station, and at the same time identifying to the receptor station the selected text SIP (among $SIP_1$ to $SIP_{128}$) so that the receptor station may interpret the assigned meaning of the selected text SIP to learn the message character (A, B, C, etc.) intended to be conveyed by the sender. For purposes of present discussion, every station of the system may be considered as having its own distinctive SI (exceptions will be apparent later). For example, an SI transmitted during $SIP_1$ conveys the message that the alphabet letter "A" was intended; and it also conveys the information that the "A" was intended by the originator to be conveyed to a receptor station identified by the particular SI transmitted, or that it is coming from an originator station having the particular SI transmitted. Whether the originator's SI or the receptor's SI is used will depend on how the system is set up as will be clear later, e.g., originator's SI will be used in a system where one wishes to say, "this message is coming from such and such an originating station"; while receptor's SI will be used where one wishes to say, "this message is destined for such and such a receptor station." Expressions such as "My SI is" and "Your SI is" will therefore help in understanding the nature of the systems involving the invention, since the expressions will identify originator or intended receptor respectively.

FIGS. 3 and 4 illustrate an SI signal transmitted during a SIP. As will be seen from FIG. 3, such a signal may be in binary words comprising various combinations of bits, meaning binary "ones" and "zeros." For example, in the one practical system used as a basis for FIGS. 1 to 5, the first two bits are used to identify a group or zone of stations in the system, while the next two bits are used to identify a particular station in the group or zone, while the fifth bit is used for various modification functions to be explained later. Thus, as illustrated in FIG. 4, the bits of FIG. 3 might result in the binary signal, 1, 1, 0, 0, 0 identifying either an originating or receptor station in a group or zone of stations, plus certain modification instructions.

Since, as will be clear later, it will be necessary to count the SIP subperiods, the SOPI is arbitrarily selected to be equal in duration to one or more SIP subperiods, as is also the HANDSHAKING INTERVAL to be explained in the next paragraph. Thus for example, in the practical system used as the basis of FIGS. 1 to 5, the SOPI is equal in duration to 2 subperiods SIP, the HANDSHAKING INTERVAL to 3 subperiods SIP, and the TEXT INTERVAL to 129 SIP, so that period P is equal in duration to 134 subperiods SIP.

After the TEXT INTERVAL subperiods SIP, there follows the HANDSHAKING INTERVAL of 3 subperiods SIP which is used for various control functions. One of these functions will be called "handshaking" as a convenient term for signaling by which the intercommunicating stations establish mutual recognition and communicate a readiness or inability to exchange messages. This is better illustrated in FIG. 5. In FIG. 5, the first subperiod SIP of the HANDSHAKING INTERVAL is illustrated as used to permit an originating subscriber to direct a signal, including the SI of the receptor station, to alert the receptor station that someone is attempting to communicate with him or "requesting service." In the second subperiod SIP of the HANDSHAKING INTERVAL, the originating station may identify itself to the receptor station by sending out the originator's SI thus indicating to the receptor station, "My SI is." The receptor station may either acknowledge by sending back the originator's SI to indicate that the receptor station is ready, or not ready, to receive messages from the originator, or by failure to do so indicate that the receptor station is "busy" and cannot receive messages. The third subperiod SIP of the HANDSHAKING INTERVAL may be used for a multiplicity of control functions such as to indicate a termination of message or an error in the message.

The FIGS. 1 to 5 have illustrated the manner in which the repetitive periods (P) are used to convey text of messages. When the system is operating to convey text, a continuing succession of periods )P) will be used so long as messages are being conveyed. The succession of periods P or the total time during which messages are being conveyed may for convenience be referred to as the TEXT TIME or TEXT MODE of periods (P).

But the principles of FIGS. 1 to 5 may also be used during a HANDSHAKING TIME (HST) or HANDSHAKING MODE of periods (P) during which time or mode the text subperiods $SIP_1$ to $SIP_{{,}29}$ may be used for certain hand shaking functions as establishing between selected stations mutual preparation of originating and receptor equipment for sending and receiving textual messages. For example, during HST, selected ones of the $SIP_1$ to $SIP_{129}$ may be labeled with directions to particular types of receptor equipment, special supplementary SIP randomizing data, geographical destination tags, file classification labels, etc.

Figures 6, 7:
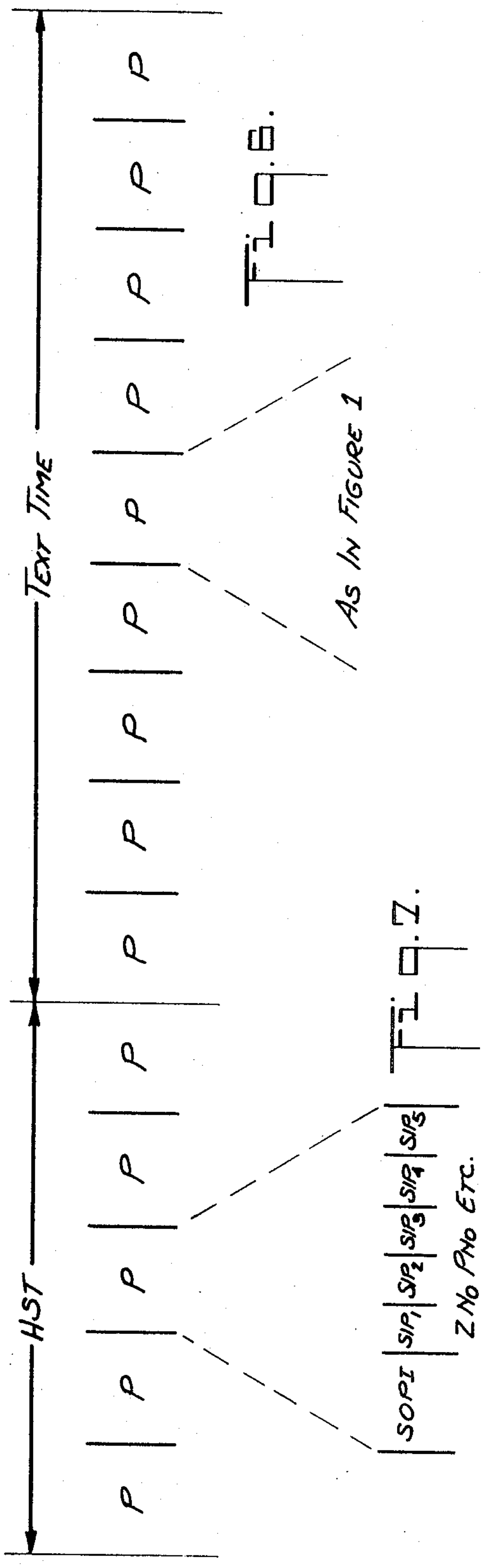

Thus, FIG. 6 illustrates a succession of periods (P) used in a HANDSHAKING TIME followed by a succession of periods (P) used in a TEXT TIME. FIG. 7 illustrates labelling of the $SIP_1$ to $SIP_{129}$ for handshaking.

With respect to FIG. 7, the exact functioning of the labellings will be clear later but they may be outlined at this point. These labels will be identified as "Z" numbers, "F" numbers, "M" numbers and "P" numbers.

Z Numbers

It will be understood that in a system operating in accordance with the principles of FIG. 1, numerous sending stations will all be "competing" for use of the time subperiods $SIP_1$ to $SIP_{129}$. In other words, the situation is that all sending stations seeking to utilize a particular text SIP, say letter E, must await their opportunity to put their SI into a particular text SIP and if that particular text SIP is already in use, they cannot use it and must try that text SIP again on the next or succeeding periods (P).

It is well known that in ordinary written language some letters of the alphabet are used with far greater frequency than others. For example, in English, the letter E is used most frequently and letters like Z most infrequently. The order of frequency of use starting with the most frequently used E is something like E, T, R, S, O ——. This necessarily means that in a system in accordance with the principles of FIG. 1, the corresponding subperiods $SIP_1$ to $SIP_{1{\circ}9}$ will be used more or less frequently depending on their alphabetic coding. It also necessarily means that some SIP, such as that for the letter E, will be in excessive demand compared to others, such as the SIP for the letter Z, and that consequently while some stations attempting to convey the letter E, for example, must wait until later periods (P) because of excessive demand for the SIP of the letter E, the SIP for the letter Z is passing unused. If a more even distribution of the demands on all text SIP could be worked out in this situation a great improvement in the use of available time would result. In other words, for example, if an excessive demand load on the time allocated to the SIP for letter E, for example, could be shifted in time to the time allocated to the SIP for the letter Z, for example, the load on the SIP for the letter E would be satisfied much faster without prejudice to demands on the SIP for the letter Z since the SIP for the letter Z is relatively unused. If shifting can be carried out in such a way that all SIP are used and none unused as time proceeds through the various periods (P) and their text subperiods $SIP_1$ to $SIP_{129}$, the system will be more efficient in use of available times.

This invention, by use of the Z number, meets the problem if not to 100 percent efficiency in use of available time, at least it approaches it (up to a calculated efficiency of about 95 percent) far better than the efficiency of present commercial systems which are about 50 percent efficient in the use of available time. What is more, the Z number as will be cleat later inherently provides a "scrambling" of the message which varies from private to secret, and in fact to an unbreakable secrecy when the Z number is chosen completely at random as later disclosed herein.

Basically the function of the Z number is to shift all text SIP counts by a fixed number at the originating station and shift the count back by the same number at the receptor station so that the SIP alphabetic labelling illustrated by FIG. 1 is restored for interpretation by the receptor station equipment. This might be said to be a shifting of the SIP time "spectrum" illustrated in FIG. 1. In the simplest Z number operation, the Z number is either changed in some periodic pattern as by simple arithmetic permutation, or, more preferably, changed completely at random from message to message by the simple technique hereinafter explained. Each originating station uses a Z different from other originating stations.

The important concept behind the Z number, particularly when it is changed completely at random and frequently, is one of completely random choice of the text $SIP_1$ to $SIP_{129}$ actually signaled during message conveyance so that there is a maximum probability that the message load imposed by all stations is uniformly distributed over all text $SIP_1$ to $SIP_{129}$. If that occurs, there is a maximized probability that efficiency in use of available time is made to approach 100 percent. It follows inherently that if the Z number is chosen completely at random, the system inherently approaches a high degree of secrecy since any unauthorized intruder attempting to analyze the message must somehow follow the random choice of Z numbers the originating station sends out to the receptor station.

F Numbers

F numbers are numbers which may be conveyed by the originating station to the receptor station during text $SIP_1$ to $SIP_{{,}29}$ to identify particular facilities, such as particular sets of files, available at the receptor station. In response to F numbers, equipment at the receptor station automatically directs messages exclusively to such facilities or excludes them from such facilities.

M Numbers

M numbers are numbers which may be conveyed by the originating station to the receptor station during the text $SIP_1$ to $SIP_{129}$ to identify particular types of machines, such as teletypewriters operating with more or less character capability, available at both the originating and receptor stations. In response to M numbers, equipment at both the originating and receptor stations matches machines existing at both the originating and receptor stations as to compatibility of character capabilities of the machines.

P Numbers

P numbers are numbers which may be conveyed by the originating station to the receptor station during text $SIp_1$ to $SIP_{{,}29}$ to identify particular customers for purposes of giving them exclusive service. In response to P numbers, equipment at both the originating and receptor stations automatically renders communications to the particular customers exclusive of all other customers.

Returning now to FIG. 7, it will be clear that during the HANDSHAKING TIME, the Z, F, M, and P numbers may be assigned to the $SIP_1$ to $SIP_{123}$ in the place of the message assignments A, B, C, etc., employed during the TEXT TIME.

FIG. 8 illustrates a system using the invention and some of the principles of FIGS. 1 to 5.

In FIG. 8, the system is set up to send information from a plurality of originating stations over a transmission path to a plurality of receptor stations. Each originating station is identified by its own distinctive SI, but the receptor stations are not so identified because their function is only to receive information. But each receptor station is also set up such that it may select information from a one or more originating stations by use of the originator's SI.

It will be understood that a system of this kind will find many uses. For example, if one wishes to monitor different types of data at various originating stations in an industrial plant, and send that information to various receptor stations in a home office, he may do so by assigning SI to the originating stations in the plant and having the receptor stations in the home office select by the appropriate SI the data desired from any particular originating station in the plant.

FIG. 8 is intended to illustrate any number of originator stations and any number of receptor stations with a transmission path therebetween. The transmission path may be wire, cable, or electromagnetic wave, as in radio or television. While only two originator and two receptor stations are shown, it will be understood that more stations will ordinarily be at both the originator and receptor ends of the transmission path and the additional stations will be identical with those shown, i.e., more originator stations 1 and 2 shown, and more receptor stations at the receptor end identical with the receptor stations 1 and 2 shown.

The equipment at all stations of the system will function synchronously as previously indicated in connection with FIGS. 1 to 5. This is illustrated in FIG. 8 by the clocks 1 and SIP counters 2 all of which operate synchronously in respect to periods P and the counting of all SIP in each period. The clock and SIP counter functions can be performed by many means well known in the electrical arts; and such means may involve equipment common to all originator and receptor stations or more or less individual to such stations. Thus it is clear that all stations in the system can recognize all periods (P) and all time subperiods SIP at the times they occur so that they may interpret the message meanings of the text $SIP_1$ to $SIP_{123}$ or interpret the control SIP of the HANDSHAKING INTERVAL.

Originator Station No. 1 will be constructed and will function as follows: Information to be transmitted from Originator Station No. 1 will be inserted into the system by means of a transducer 3 which will include some kind of mechanism for translating information into the form indicated by FIGS. 1 to 5, namely, in which all of the TEXT SIP are assigned alphabetical meanings. For example, assume that the transducer includes a teletypewriter device which, on being caused to print the letter H, also translates it to the binary word 0,0,0,0,1,0,0,0 (8 in decimal arithmetic) which is the count number for text $SIP_8$ to which the letter H is assigned (FIG. 1). This binary word 0,0,0,0,1,0,0,0 will then be stored in conventional storer 4. Storer 4 is for so called "dynamic storage" and may take many forms such as a transistorized flip-flop circuit, drums, tapes, punch cards, etc.

Text SIP counter 2 will also be counting the text SIP of successive periods P in binary form, that is 0,0,0,0,0,0,0,1 for text $SIP_1$; 0,0,0,0,0,0,1,0 for text $SIP_2$; 0,0,0,0,0,0,1,1, for text $SIP_3$; 0,0,0,0,0,1,0,0 for text $SIP_4$; 0,0,0,0,0,1,0,1 for text $SIP_5$; 0,0,0,0,0,1,1,0 for text $SIP_6$; 0,0,0,0,0,1,1,1 for text $SIP_7$; 0,0,0,0,1,0,0,0 for text $SIP_8$ and so one for higher numbers.

At this stage there is therefore stored in storer 4 the information that Originator Station No. 1 wishes to signal text $SIP_8$ over the transmission path so that a receptor station may interpret $SIP_8$ and thereby know that the letter H was intended to be conveyed. This signalling is accomplished by having Originator Station No. 1 send its identifying SI over the transmission path during the time subperiod of text $SIP_8$. The receptor station will thereby also be able to identify the originator as Sending Station No. 1 by its identifying SI. The way this is accomplished is as follows:

Text SIP counter 2 successively feeds the above binary counts of Text $SIP_1$, $SIP_2$, $SIP_3$–$SIP_{123}$ into comparator 5 which is also fed by storer 4. During each successive SIP, comparator 5 compares the binary count stored in storer 4 by transducer 3 with the binary SIP count from TEXT SIP counter 2. If the two are identical (as for $SIP_8$ in the above example), the comparator 5 actuates "send SI" device 6 to send the SI of Originator Station No. 1 over the transmission path. The SI will of course go over the transmission path synchronously with $SIP_8$. At the same time, "send SI" device clears the storer 4 by suitable "clear store" device 7. If the comparator 5 finds no identity of the binary counts from counter 2 and storer 4 the "send SI" device 6 is not actuated.

It will be necessary to provide a way to insure that not more than one Originator Station sends its SI at the same time and this involves Originator Station selector 8. But to accelerate the reader's comprehension of fundamental principles of the system, the receptor end of the system will be described first and the station selector 8 later.

It should be now clear that the SI Originator Station No. 1 proceeds over the transmission path in time coincidence with the SIP to be identified to receptor stations. In the example used, the SI of Originator Station No. 1 occurs in $SIP_8$ to that receptor station may interpret it as the letter "H" coming from Originator Station No. 1.

Therefore all the receptor stations needs to do is to detect the SI of the Originator Station the receptor station wishes to select and then relate it synchronously to the synchronously occurring text SIP.

Therefore, the receptor station in FIG. 8 detects the SI in its binary form indicated in FIGS. 3 and 4. The SI being binary in form is readily detected by any well-known means indicated as detector 9. Upon detection of the SI, the detector 9 puts out a signal which is applied to gate 10 which will put out a signal whenever SIP counter 2 of the receptor is running through the SIP corresponding in time to that of the SI detected at detector 9. Since SIP counter 2 of the receptor is synchronous with SIP counter 2 of the Originator Station because of synchronous clocks 1, SIP counter 2 of the receptor will present $SIP_8$ to gate 10 at the same time that the SI of Originator Station No. 1 is sent over the transmission path. Therefore, during $SIP_8$, gate 100 will put out a signal meaning "this is the SIP to be interpreted for message meaning."

The output of gate 10 will be fed to transducers 11, corresponding to transducers 3, but which convert the binary form of the SIP numbers back to into alphanumerical characters. For example, assume that the transducers 11 include a teletypewriter device which, on receiving the binary word 0,0,0,0,1,0,0,0 (8 in decimal arithmetic) which is the number of $SIP_8$, causes a teletypewriter to print the letter H.

Thus far the system of FIG. 8 has been described as a system in which each Originator Station sends out its own identifying SI signal so that any receptor station may identify the source of the information it is receiving. It will be understood however that each Originator Station may send out not its own by rather the identifying SI signal of a receptor station so that any receptor station may identify by the destination of the information to be received rather than by its source. In other words, the receptor station may say, "this message is for me because it has my SI," rather than, "this message is for me because it has the SI of the originator I am looking for." The latter arrangement of identifying by receptor's SI will be useful where, for example, one or more Originator Stations wish to direct information to selected receptor stations. Moreover, it will be understood that while the system of FIG. 8 is shown as a one-way system, it can be made into a two-way system simply by duplicating it in the opposite directions.

For purposes which will be more clear later, it will be desirable to provide a buffer, not shown, for storing the SI of another subscriber with whom a given subscriber is communicating, and to process SI signals through shift register devices 12, and 13.

The Z number operation is illustrated in FIG. 8 by the Z number generator 14 at the Originator Stations No. 1 and No. 2. Z number generator 14 adds some arbitrary binary number to storer 4 so that the binary number stored therein is changed to that corresponding to some other text SIP. For example, if the binary Z number 0,0,0,1,0,0,0,0 (16 in decimal) is added to the binary number 0,0,0,0,1,0,0,0 for the count of $SIP_8$ (letter H) in the storer 4 of the above example, the result will be 0,0,0,1,1,0,0,0, (24 in decimal) corresponding to $SIP_{24}$ which corresponds to the letter X. Consequently the letter H stored in Storer 4 as binary 0,0,0,0,1,0,0,0 will in effect be transmitted as though it were the letter "X."

But at the receptor station, the process will be reversed to restore the letter H. That is to say that at the receptor station, the binary Z number 0,0,0,1,0,0,0,0 is subtracted to restore the binary number 0,0,0,0,1,0,0,0 (letter H). Subtraction may be accomplished by well known "bit-by-bit" adding. In FIG. 8, this is illustrated by Z number generator 15.

Referring now to FIG. 9 there is shown a way of implementing the function of Originator Station selector 8 of FIG. 8. In FIG. 9, to illustrate the function of Originator Station selector 8 of FIG. 8, that function is shown as being performed by a motor driven array of mechanical switches although it will be performed in practice by an electronic system capable of the much higher speed of operation required in practice and which will be illustrated later.

In FIG. 9, the system of FIG. 8 is somewhat rearranged. In FIG. 9, six Originator Stations similar to those of FIG. 8 are shown, but unlike FIG. 8, the Originator Stations have a common comparator 5 similar to comparators 5 of FIG. 8, a common gate 17 similar to the gates of FIG. 8, a common SIP counter 18 similar to counters 2 and clocks 1 of FIG. 8, and the common shift register 12 of FIG. 8.

Each of the six Originator Stations is represented by a storer 19 similar to storers 4 of FIG. 8, and a SI generator 20 which in FIG. 8 would be part of send SI gate 6.

It will be noted that series of ganged rotary switches 21, 22 and 23 are provided and their rotary arms indicated by the arrows will be rotated in unison in stepped fashion from fixed contact to fixed contact so that their rotary arms stop momentarily at each trio of fixed contact shown by the numerals 1, 2, 3, 4, 5 and 6 as associated with each Originator Station No. 1, No.2No. 3, No.4, No.5 and No.6. In other words, the moving arms indicated by the arrows as resting on the trio of contacts for Originator Station No. 2 will next move to the trio of contacts for Originator Station No. 3 and rest there momentarily before proceeding similarly around to the contact trios for Originator Stations Nos. 4, 5, 6 and 1 and then repeating the cycle at high speed.

The switch arms will be rotated in this manner by a high-speed motor 24 at a speed such that the switches can complete one cycling of all six Originator Stations No. 1 to No.6 during the time of each Text SIP and repeat the cycling for the next Text SIP, although any one cycle may be terminated part way through its course. To this end the counter 18 will not only control the timing of SIP counts to comparator 5, but also the starting and stopping of motor 24 to insure that it can cycle switches 21, 22, and 23 through Originator Stations No. 1 to No. 6 once during each text SIP.

It should be clear from FIG. 9 that operation will be as follows. As previously indicated, the storer 19 of anyone Originator Station will be storing a binary signal corresponding to the SIP count of the text SIP to be identified by the sending of a SI from that Originator Station, for example, 0,0,0,0,1,0,0,0 for the letter H in the above example. The SIP counter 1 will be counting text SIP and the binary SIP count will be available to comparator 5 at the beginning of each text SIP. For example, at the beginning of the text SIP. For example, at the beginning of the text SIP for the letter H, the count 0,0,0,0,1,0,0,0 will be available from counter 18 to the comparator 5 as in the example of FIG. 8. Assume that it is the Originator Station No. 2 which in FIG. 9 is storing 0,0,0,0,1,0,0,0 for the letter H. In that case, with the arms of switches 21, 22 and 23 in the position shown, when the counter 18 supplies 0,0,0,0,1,0,0,0 to the comparator 5, the comparator (through switch 21) will recognize the match between the binary number of the counter and the binary number stored in storer 19 of Originator Station No. 2, and enable gate 17 to permit Originator Station No. 2 to send its SI through switch 22 and gate 17. At the same time, the storer 19 of Originator Station No. 2 will be cleared (through switch 23) and motor 24 will be stopped by a signal from comparator 5 and not restarted until the next text SIP.

It will be apparent that as the switch arms proceed around the cycle of the Originator Stations, if any Originator Station has no binary number stored corresponding to the binary of the text SIP of the cycle, the comparator 5 will not produce an output and consequently gate 17 will not be enabled and motor 24 will continue to run to subsequent Originator Stations. It is only when the stored binary count of any Originator Station matches the binary SIP count of the cycle in progress that comparator 5 produces an output and then enables gate 17 and stops motor 24 for the duration of the SIP. The motor is restarted at the beginning of the next SIP by SIP counter 18.

When gate 17 is enabled, the SI of the Originator Station is transmitted therethrough to the shift register 12 for storage.

With the arrangement of FIG. 9, the Originator Stations No. 1 to No.6 are sampled in order so that priority in occupying any one SIP goes to the first Originator Station having a SI to send in that SIP. Later it will be shown that it is possible to establish a different order of priority permitting Originator Stations with more urgent messages to preempt a particular SIP ahead of other Originator Stations with less urgent messages.

The FIGS. 8 and 9 have explained the principles of transmission in what is essentially a one-way direction from Originator Stations to receptor stations. The remaining figures will develop the manner in which systems capable of two-way communication may be devised.

Figure 10:
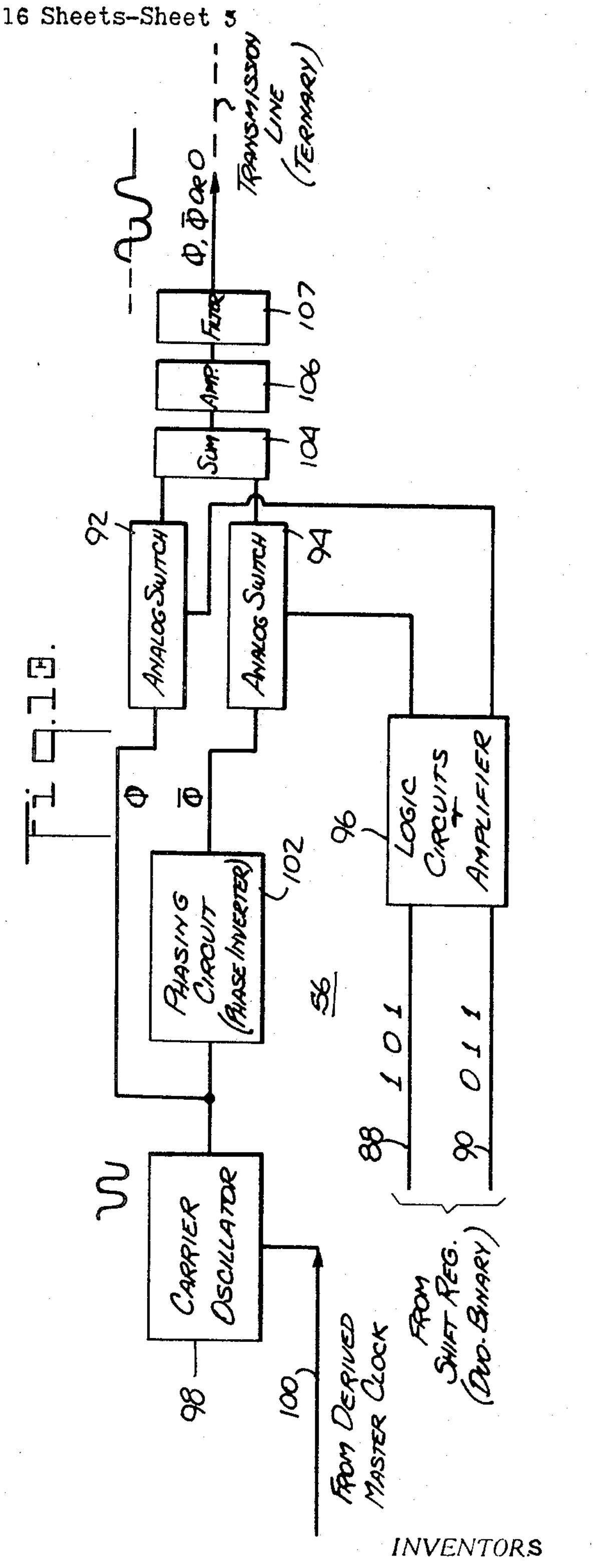

Referring to FIG. 10, showing the general scheme, a group of receptor stations and a group of Originator Stations are shown at various locations A, B, C along a transmission path. The locations A, B, C might, for example, be considered as at widely separated geographic locations interconnected by the transmission path. There may be any number of such locations with groups of receptor and Originator Stations along the transmission path.

Each location A, B, C, has a two-part (receive and send) master shift register 30, all of which are serially connected along the transmission path. The function of the shift registers 30 is to receive and record the SI as they come along the transmission path so that the receptor stations may detect them and process them; also to repeat them so that they may go along the transmission path to receptor stations farther along the path; and also to send SI from the Originator Stations down the transmission path when needed SIP are available for use by the Originator Stations.

Thus at any one location, A, B, C, the SI coming along the transmission path are received in a Receive Shift Register 31 for "reading" by the receptor stations associated therewith, and then passed on to a Send Shift Register 32 for further transmission along the transmission path to the next shift register 30.

SI are introduced into the transmission path by the Originator Stations which "write" their SI into the Send Shift Registers 32. If the particular SIP the Originator Stations wish to use is already occupied in Send Shift Register 32, the Originator Stations will store the SI until they find the desired SIP not in use in a later period (P). Means are provided to insure that if the particular SIP is already in use in the Shift Registers 32, the Originator Stations cannot enter a SI in the Shift Registers 32 until the Shift Registers 32 are cleared. Thus, in FIG. 10, there are provided, the station selectors 33 which send the SI to the Shift Registers 32 through gate 34 by way of gate 36, provided that "OR"-gate 36 so permits. Empty SIP Detector 35 can detect the presence of a SI stored in Shift Register 32 and if it does so detect a SI, it blocks gates 36 so that no SI can be sent to the Shift Register 32 from the Originator Stations by way of gate 34. If Empty SIP Detector 35 indicates that no SI is recorded in Shift register 32, the "OR"-gate 36 is operative to pass Originator Station SI through gate 34 to Shift Register 32.

As with FIGS. 8 and 9, the incoming SI recorded in Shift Registers 31, will be detected by SI detector 37 and passed to the receptor stations.

DESCRIPTION OF THE FIGURES 11–27

Figure 11:
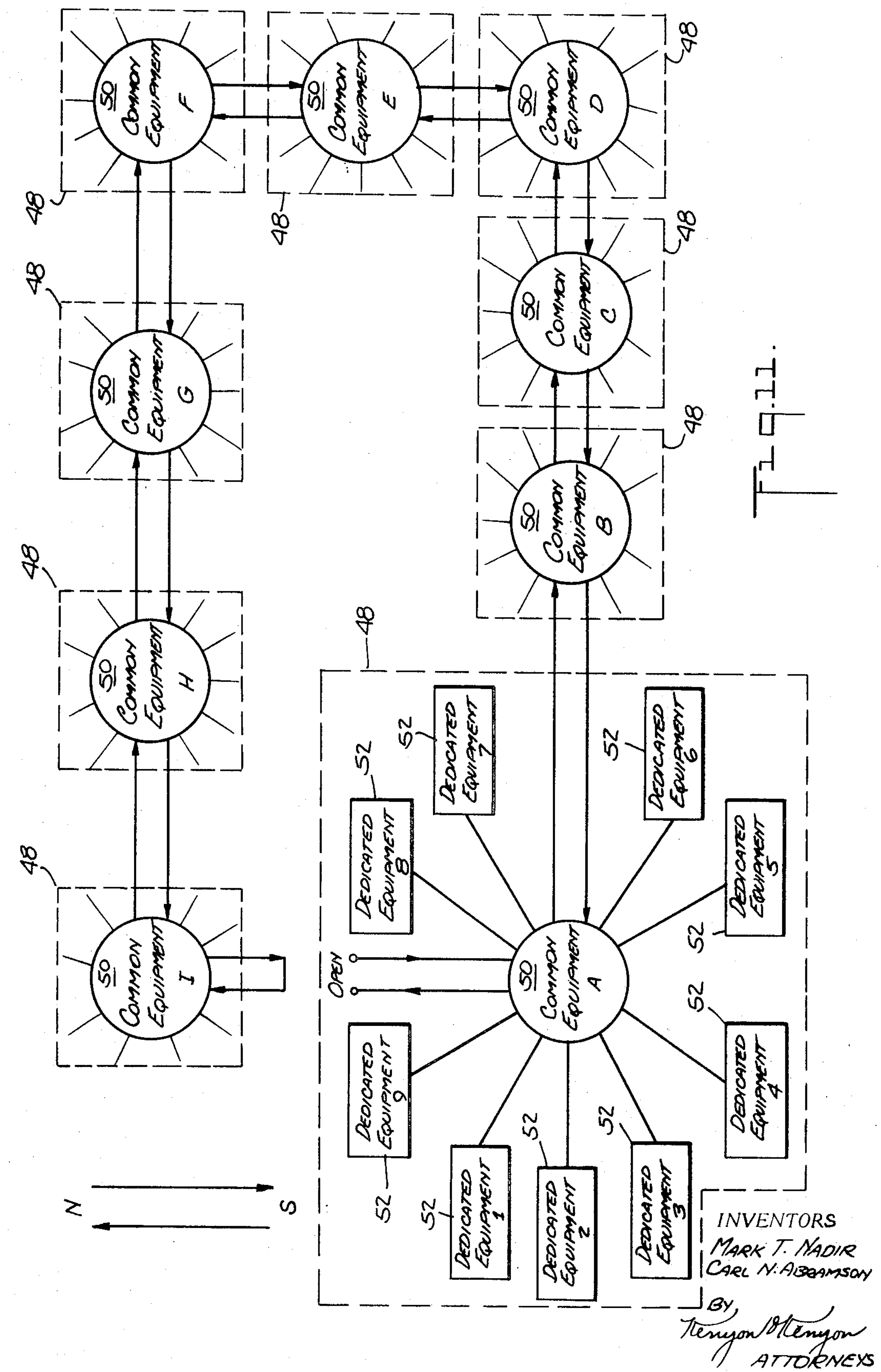
Figure 12:
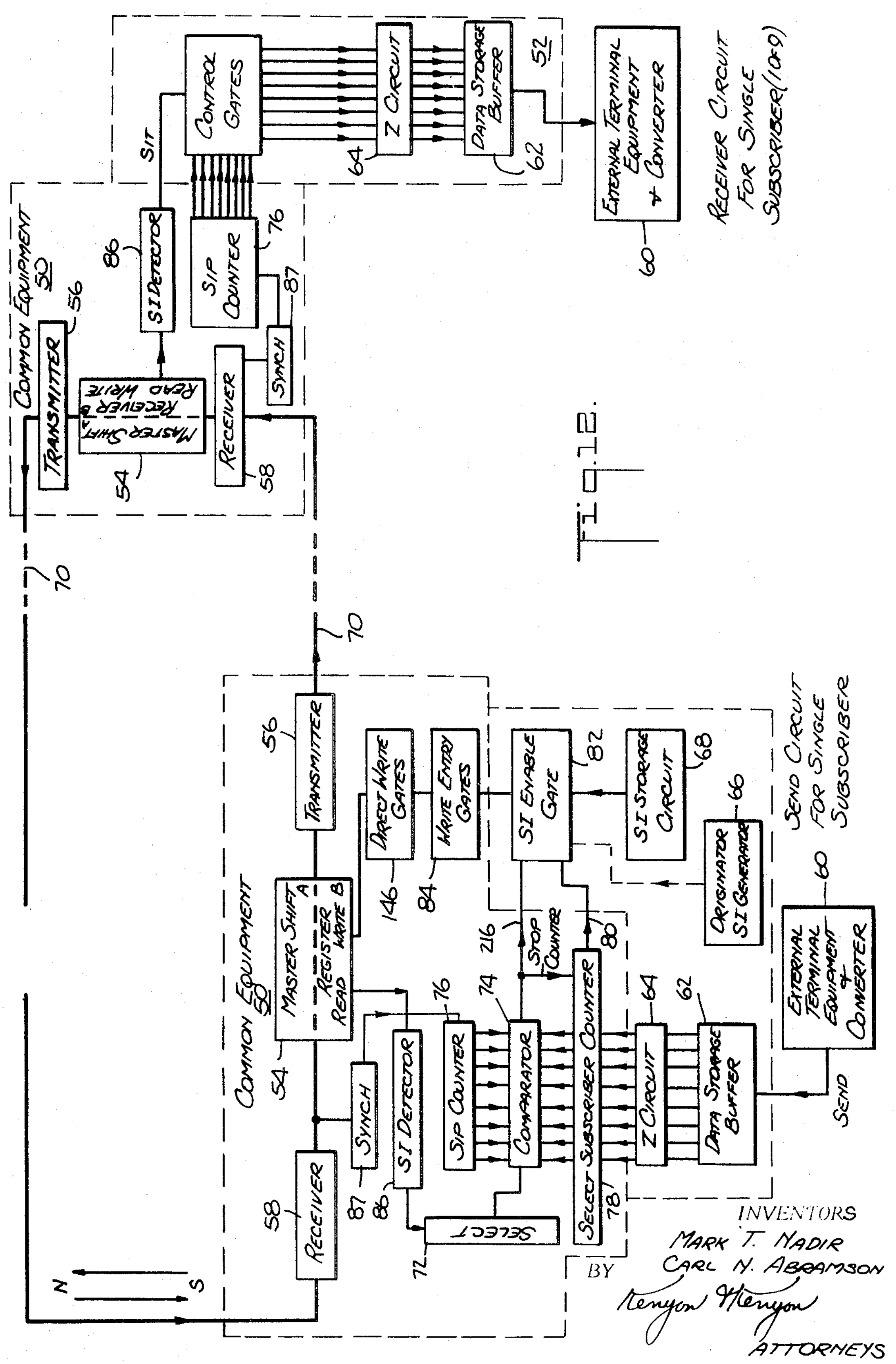
Figure 14:
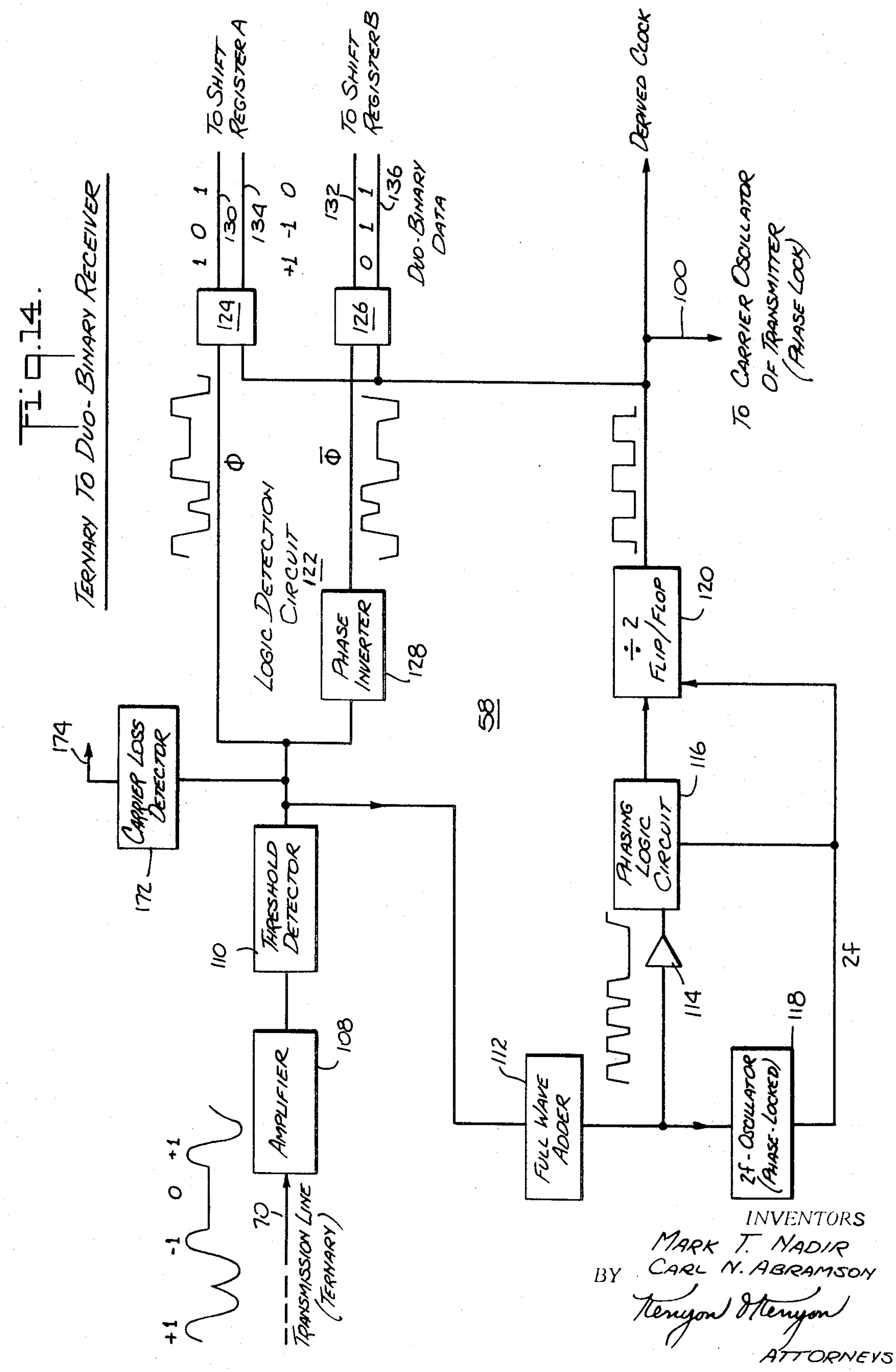
Figure 15:
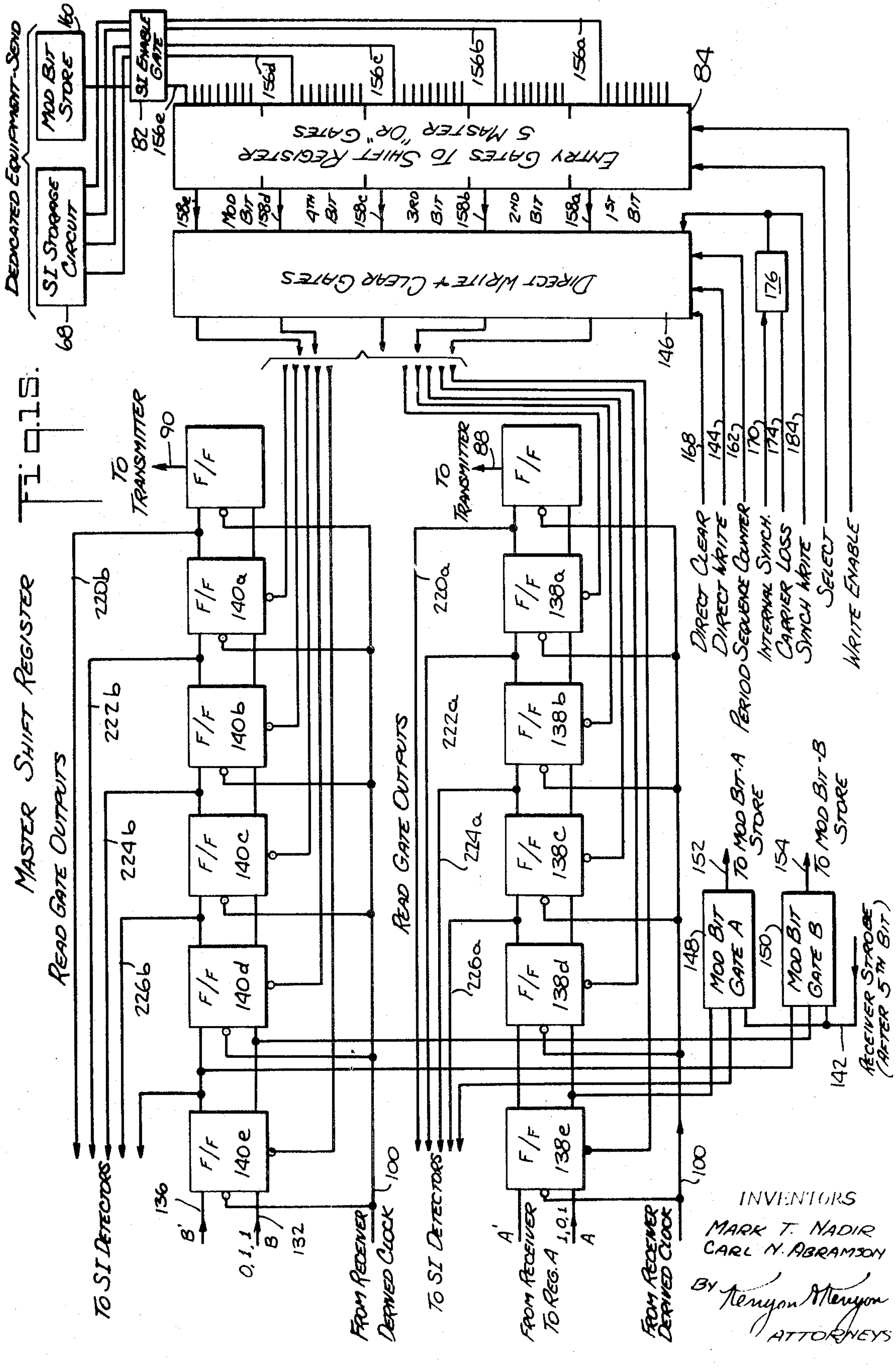
Figure 16:
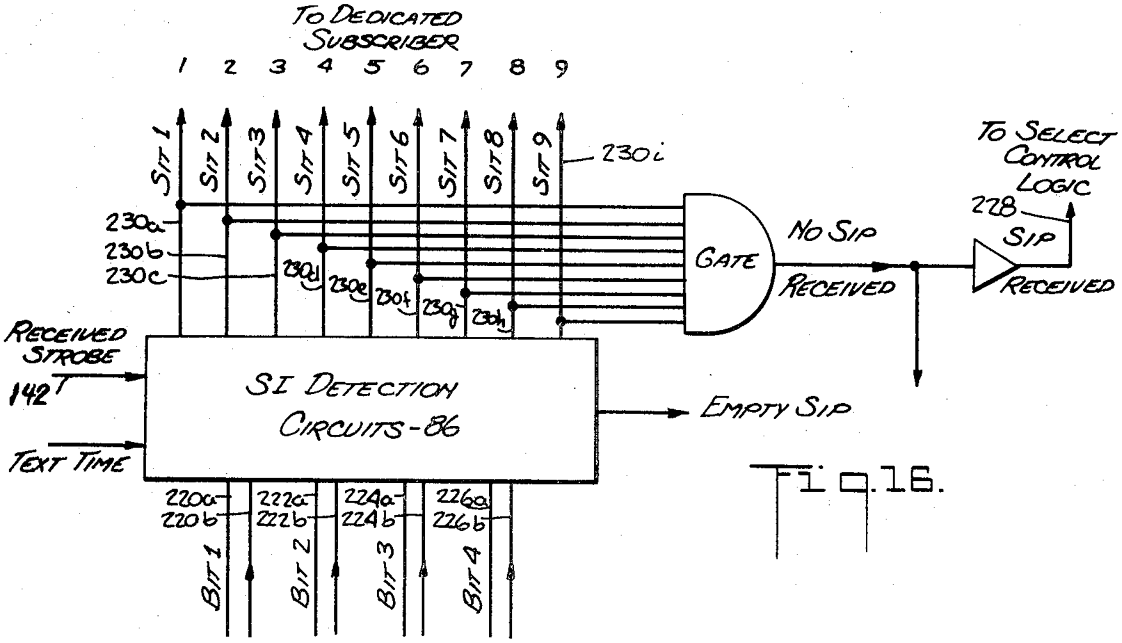
Figure 18:
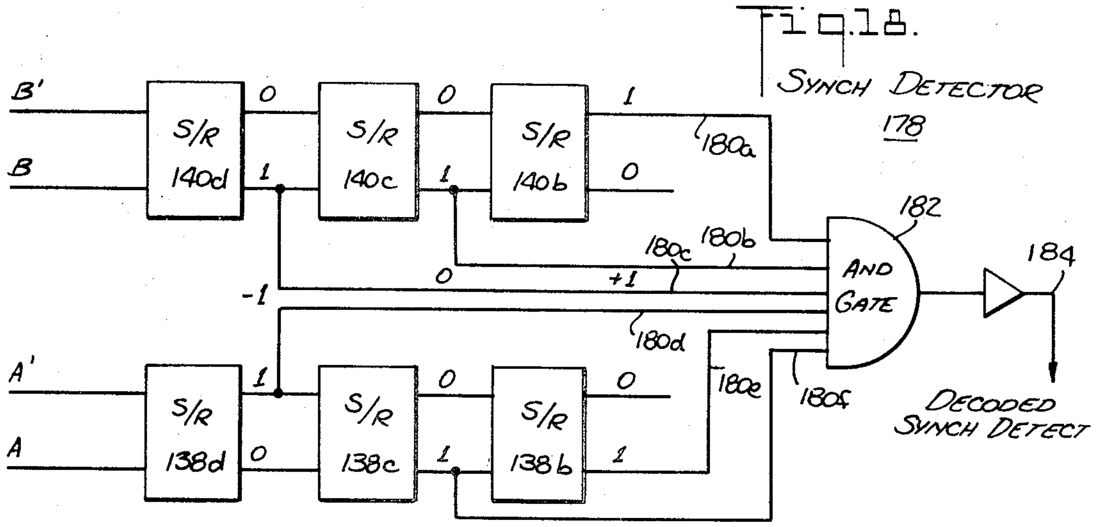
Figure 19:
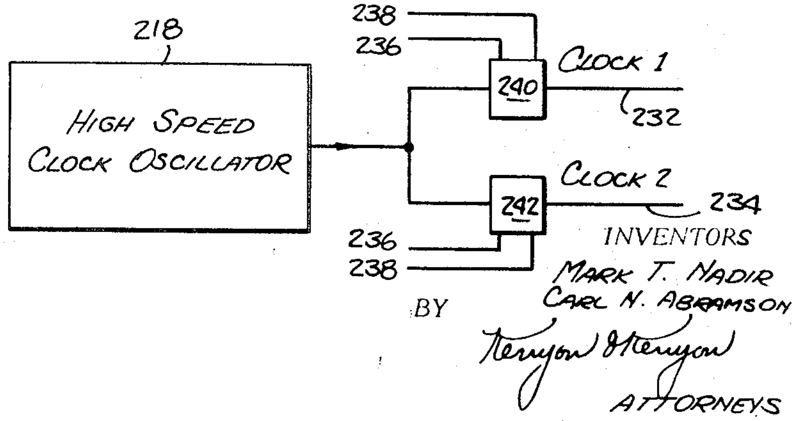
Figure 17:
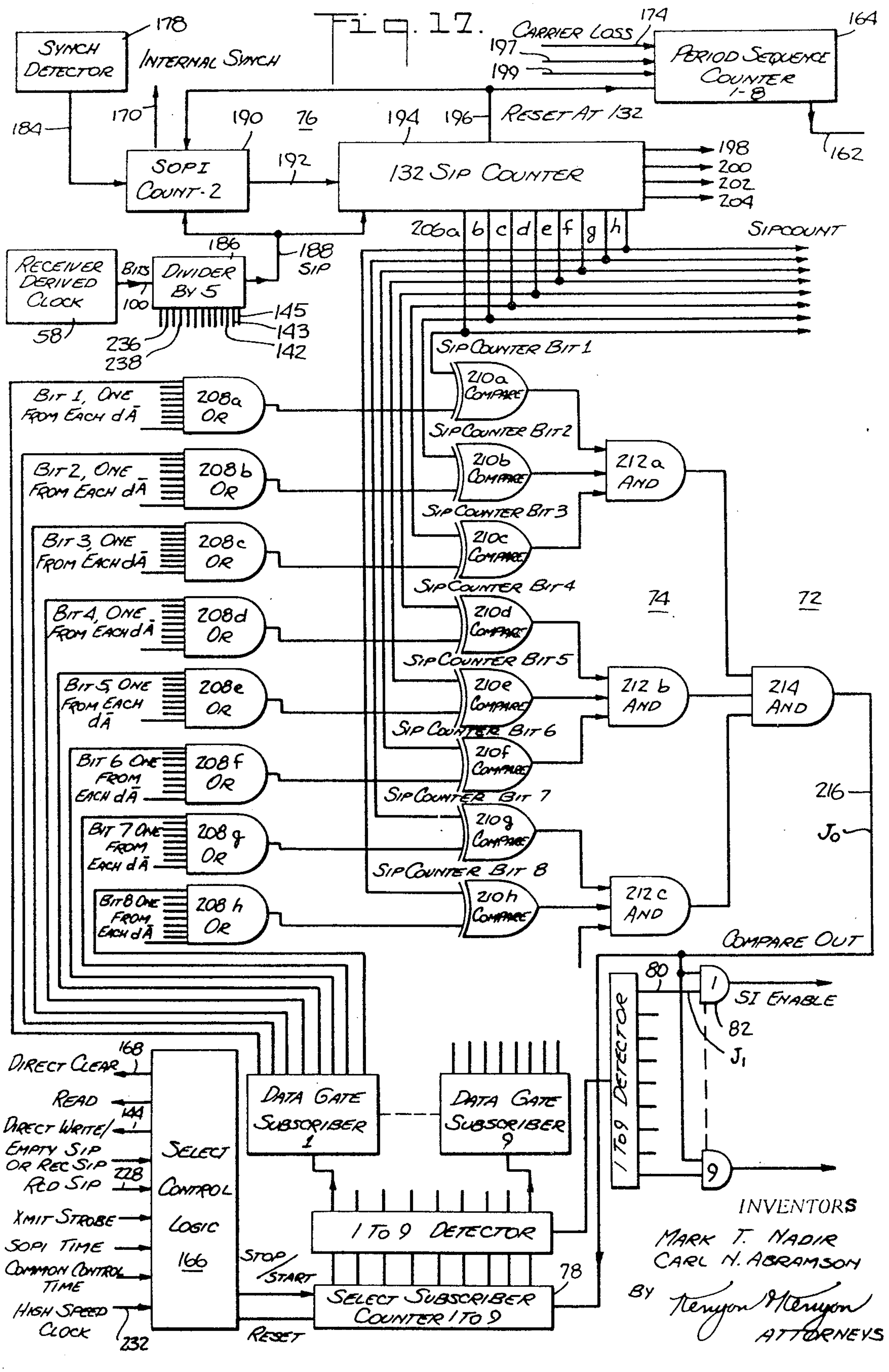
Figure 20:
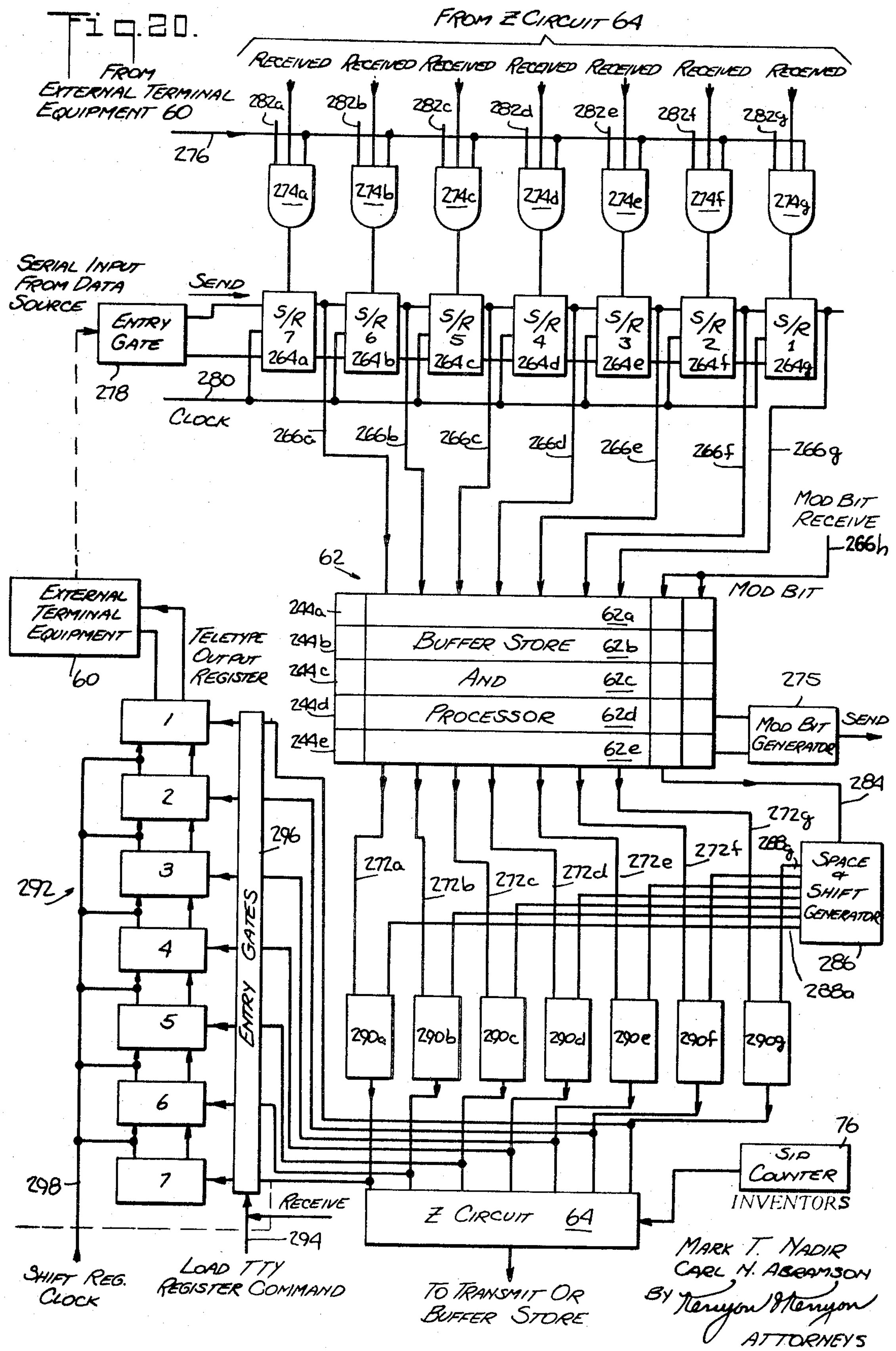
Figure 21:
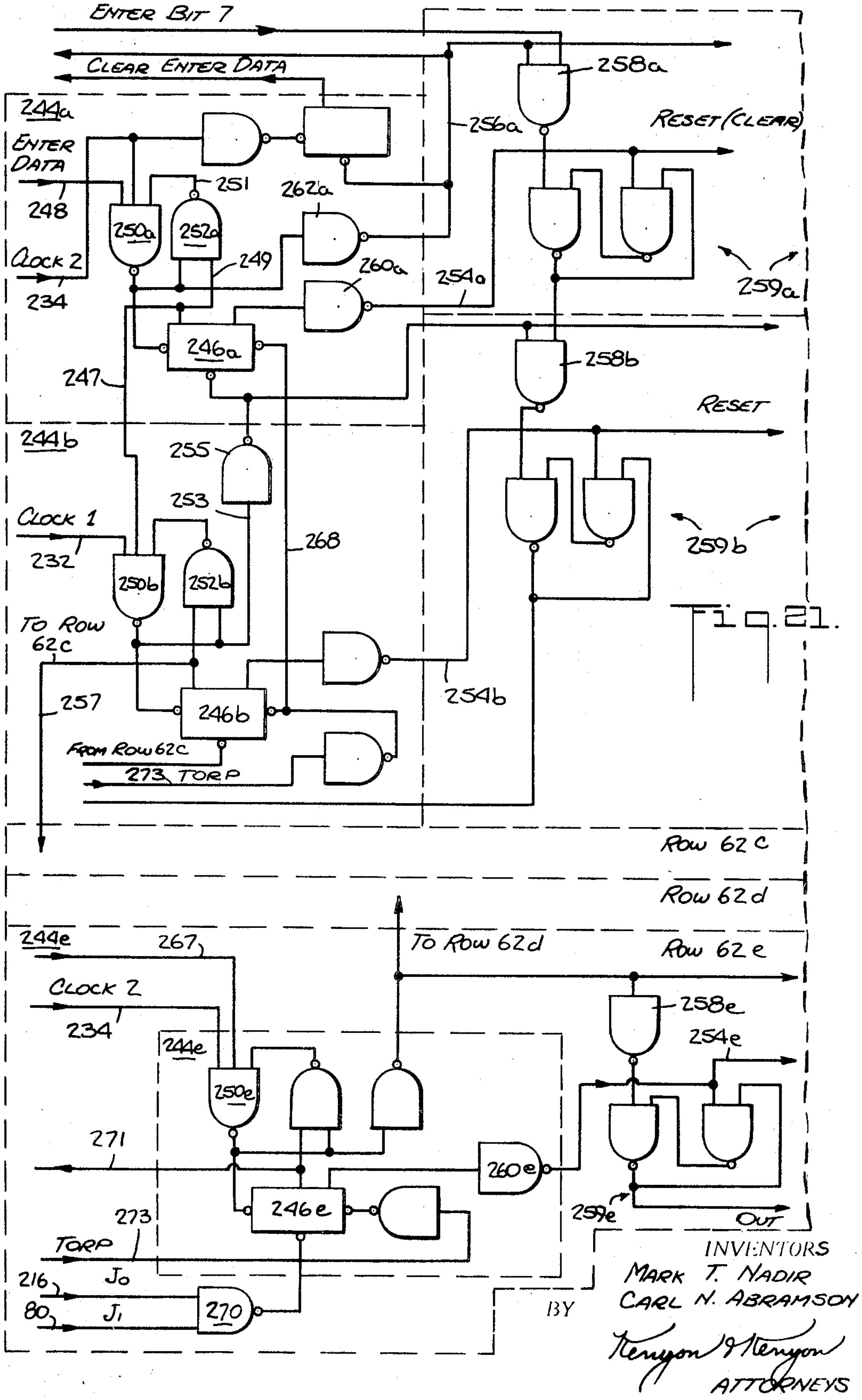
Figure 23:
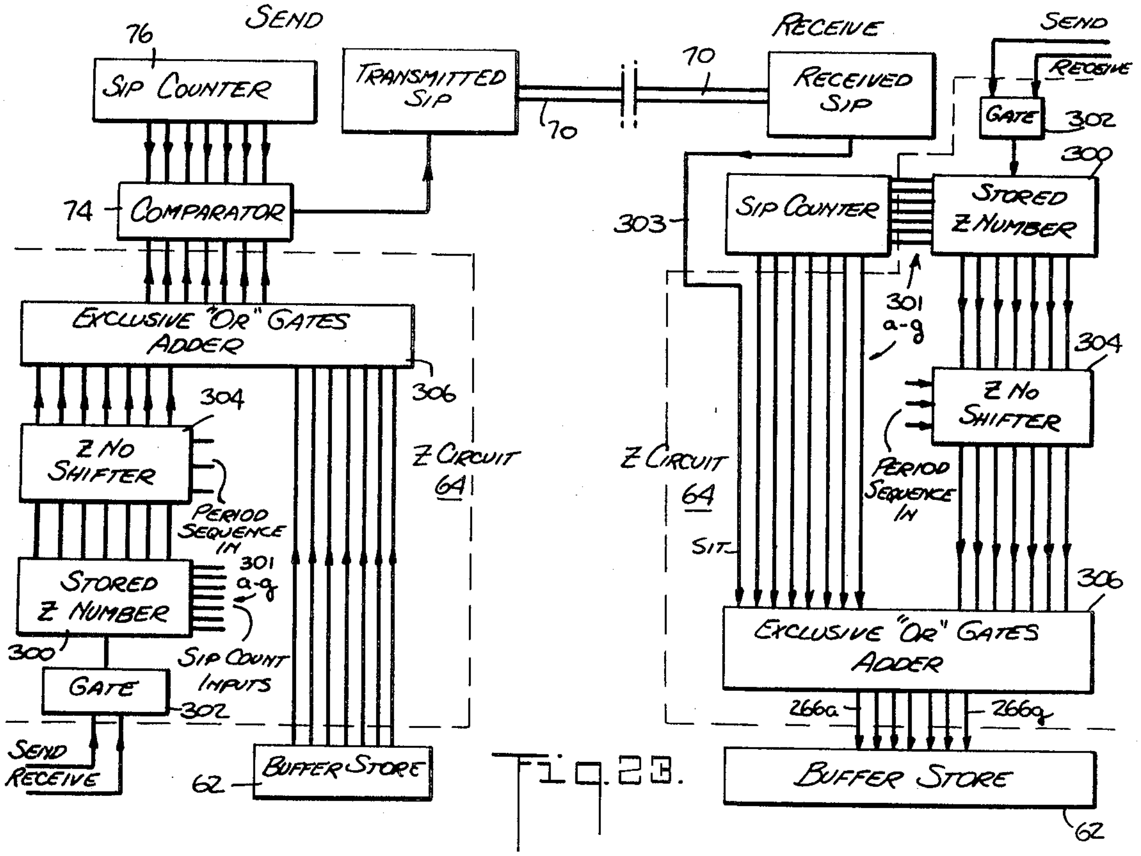
Figure 22:
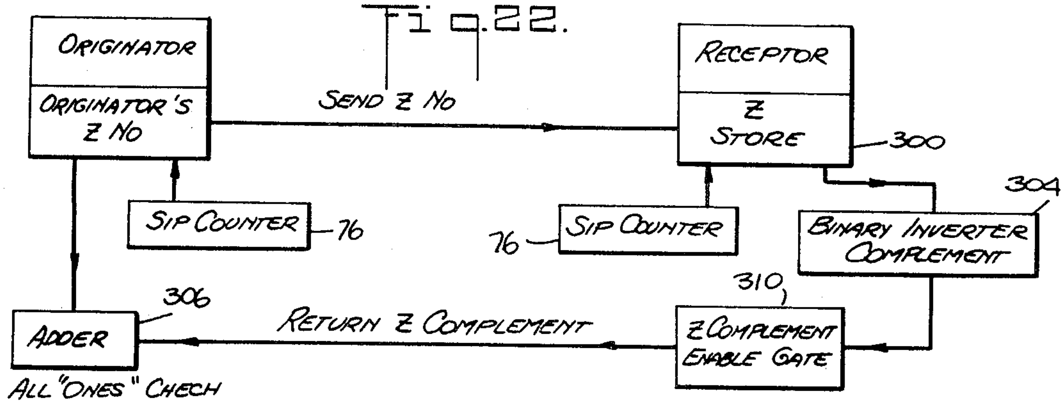
Figure 24:
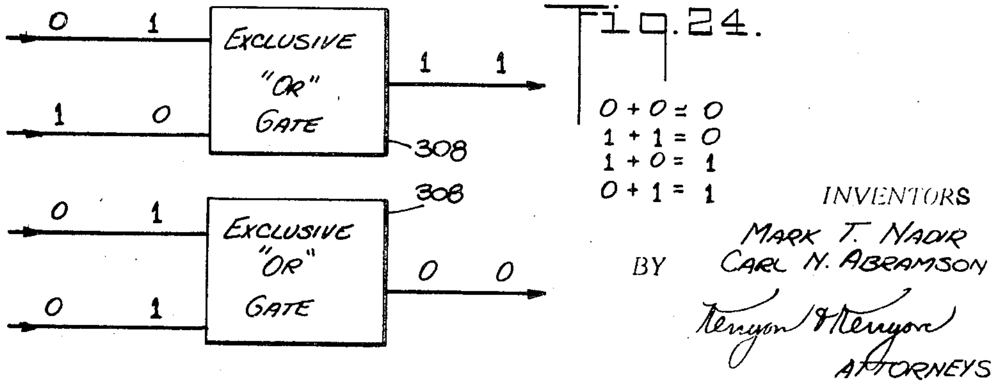
Figures 25, 25A, 25B:
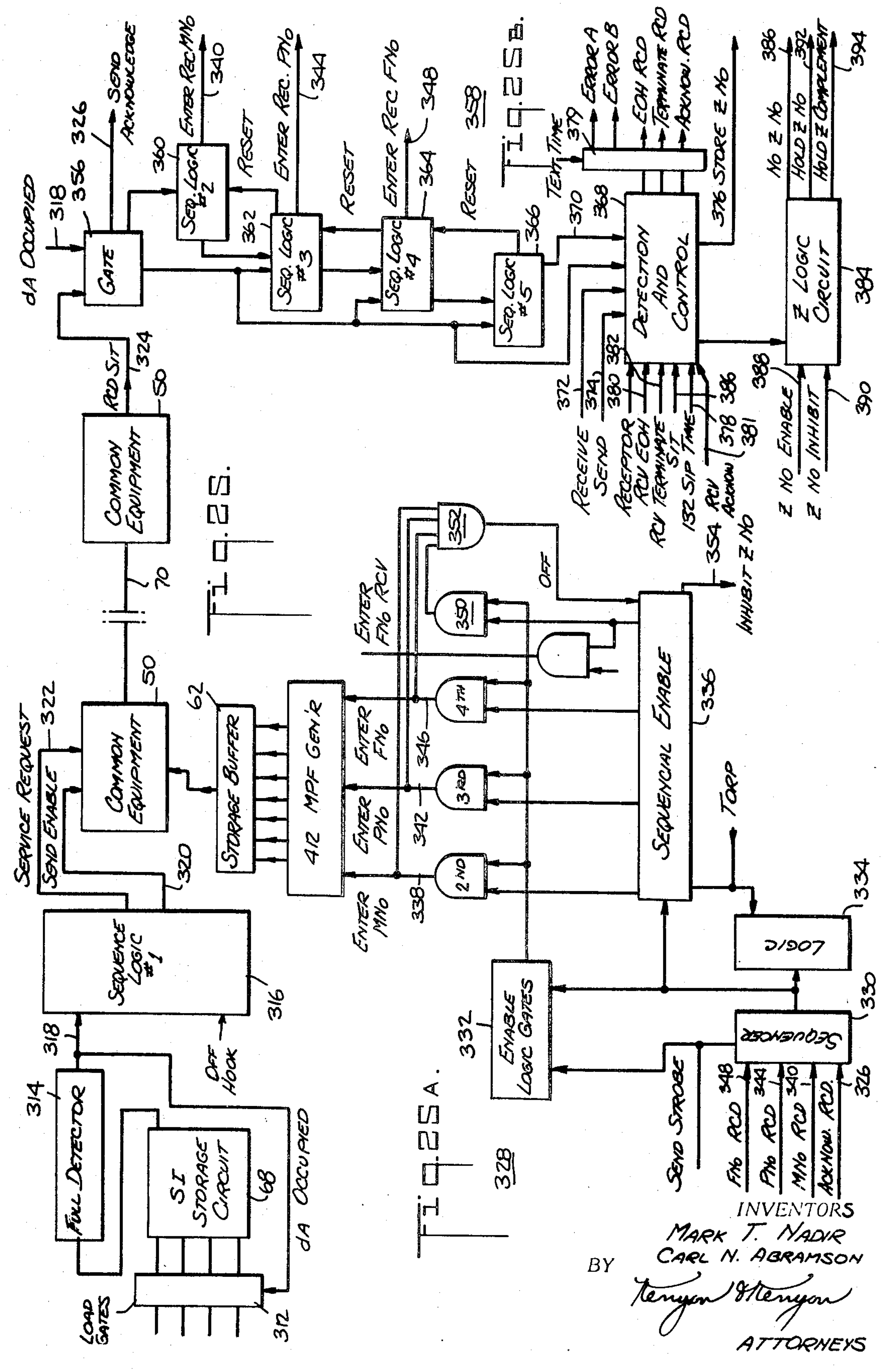
Figures 26, 27:
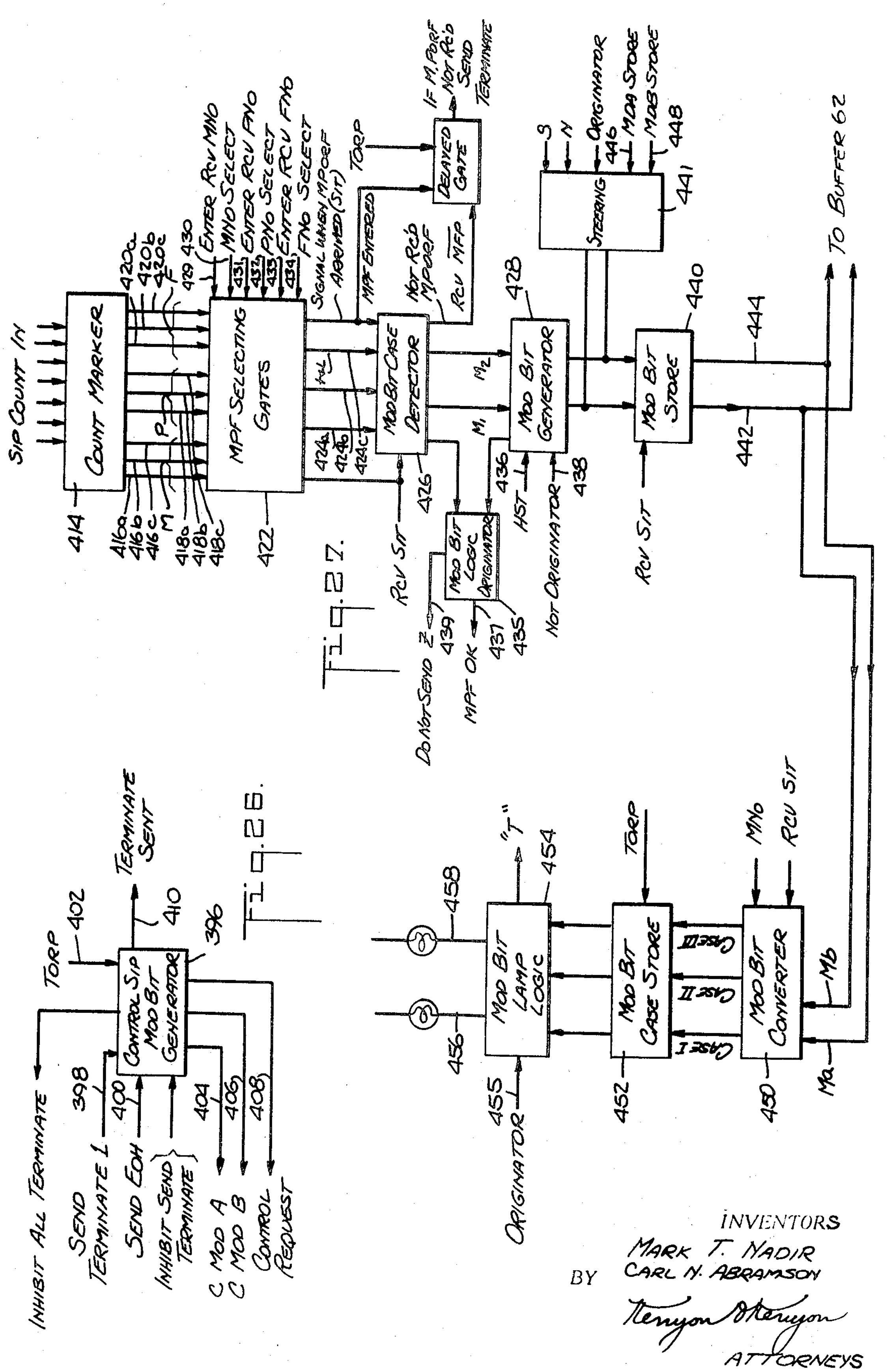

FIG. 11 shows a block diagram of a system for information exchange having nine adapters connected in a linear network, illustrative of the invention shown in FIGS. 11 through 27;

FIG. 12 shows a more detailed circuit diagram of a portion of the system of FIG. 11 with the circuit flow paths in the common equipment and the dedicated equipment drawn for two subscribers in the send and receive modes of operation, respectively;

FIG. B is a circuit block diagram of the duobinary to ternary transmitter of the common equipment:

FIG. 14 is a circuit block diagram of the ternary to duobinary receiver of the common equipment;

FIG. 15 shows a circuit block diagram of the master shift register of the common equipment, including the gates for writing data into such shift register;

FIG. 16 shows the input and output lines associated with the SI detection circuit;

FIG. 17 shows the select mechanism of the common equipment, including the comparator, SIP counter and select subscriber counter circuits;

FIG. 18 shows a circuit block diagram of the synch detector;

FIG. 19 shows the input and output lines associated with the high-speed clock oscillator;

FIG. 20 shows a circuit block diagram of the buffer store and the send and receive registers connecting such buffer store with the external terminal equipment;

FIG. 21 shows a circuit block diagram of the logic control entry gates and flip-flops for the buffer store;

FIG. 22 shows a block diagram of the validation circuitry used for checking on the receipt of the correct Z-number;

FIG. 23 shows a circuit block diagram of the Z-circuit as it is connected in the dedicated equipment during the send and the receive modes of operation;

FIG. 24 shows a logic diagram illustrating the logic operation of the exclusive "OR" gates, employed in portions of the equipment;

FIGS. 25A and 25B, respectively, show the sequence logic diagrams for the handshake circuits of the originator and the receptor, respectively;

FIG. 26 shows the input and output lines associated with the modification bit generator for the control SIP; and FIG. 27 shows a block diagram of the MPF validation circuitry used during the handshake procedure.

COMMON AND DEDICATED EQUIPMENT

FIGS. 11 through 27 show a system for information exchange, illustrative of a preferred embodiment of the present invention.

Referring to FIG. 11, there is shown a general block diagram of the overall system which is constituted by nine adapters 48 connected in a linear network. As indicated by the dotted line enclosure, each adapter 48 comprises one common equipment 50 which, for purposes of describing this invention, services nine subscribers equipped with an individual or dedicated equipment 52. Of course, it is to be understood that any number of adapters 48 and dedicated equipments 52, other than that number shown in FIG. 11, can be connected together to meet the requirements of a given system.

As shown by FIG. 12, the dedicated equipment 52 for each subscriber will be connected to an external terminal equipment and converter unit 60, such as a teletype unit. Unit 60 is a part of the external equipment used in conjunction with the system of the present invention for converting data from its standard symbol or word form into an eight bit binary character form, and thus does not form a part of the dedicated equipment 52. Generally, the dedicated equipment 52 comprises a data storage buffer 62 for storing the binary characters, and a Z-circuit 64 for transforming a given binary character into a different binary character and for restoring it to the original character, by operating with a predetermined binary number on each character. The dedicated equipment 52 also comprises an originator station identifier, hereinafter called SI generator 66, which puts out the identifying binary signal of the particular subscriber station, and a SI storage unit 68 used to store the SI of another subscriber station. It is pointed out that each dedicated equipment 52 will have its own designated SI, as well as a randomly selected Z number which will be communicated to another subscriber in the system during the hand shake procedure. Also, each dedicated equipment 52 will operate from a common time base which is derived by timing circuit and clocks located in the common equipment 50.

The common equipment 50 generally comprises a master shift register 54 for receiving data in the form of binary labeled SI, and modification bit (mod bit) signals which act to modify the content of information, from any one of its nine subscribers engaged in the send mode and placing it on the transmission line 70, or for receiving the SI's coming off of the transmission line 70 and designated for receipt by one of the nine subscribers of such master shift register 54. Thus, any one of the nine subscribers can read information, which is designated for such subscribers, out of the master shift register 54 or, alternatively, any one of these nine subscribers may write information into the master shift register 54 for transmission. The master shift register 54 is connected on each side, respectively, to a ternary to duobinary receiver (demodulator) 58 and a duobinary to ternary transmitter (modulator) 56. As noted previously, since the system transmits information on the line 70 in ternary form consisting of a first sine wave, equivalent to plus one, a second sine wave, inverted with respect to such first sine wave and equivalent to minus one, and a zero-level signal equivalent to a zero, then the ternary data must be transformed into or out of binary form. Accordingly, the receiver 58 and transmitter 56 of the common equipment 50 perform these functions so that the information may be written into or read out of the master shift register 54 in binary form. For convenience, a duobinary system is operated in conjunction with the ternary line data.

As mentioned above, at certain times the SI of a particular subscriber will be entered into the master shift register 54. However, the particular time at which this entry occurs is critical to the transmission of information since the information content or character text is determined by the particular text SIP into which the SI appears. For instance, if the 15th text SIP has been designated to represent the letter "0" in the external terminal equipment and converter 60 of two subscribers, then the appearance of the receptor 's SI in the 15th SIP will indicate to the receptor in his external terminal equipment and converter 60 that the character "0" is being transmitted. With such point in mind it is obvious that the writing of a SI into the master shift register 54 can be made only at the particular SIP time in the period representing the particular character to be transmitted. To accomplish the entry or writing function into the master shift register 54, a select mechanism 72 is employed to select the particular one of nine subscribers to enter data into the register 54 at each available SIP time. Select mechanism 72 includes a comparator circuit 74, a SIP count circuit 76, and a select subscriber counter 78.

The comparator circuit 74 compares the binary data submitted by the Z-circuits 64, of any of the nine subscribers wishing to send such data, with the binary characters flops 244*a*, *b* and *e* of the buffer rows 62*a*, *b* and *e* in logic block form to illustrate the operation of the buffer 62.

When the equipment is turned on, a turn on reset pulse (TORP) is produced on line 273 to set the gates and flip-flops to their initial condition. More specifically, logic control entry flip-flops 246*a*, *b* and *e* respectively, are associated with a respective buffer row 62 *a*, *b* and *e*, as shown in FIG. 21. Entry flip-flops, not shown, are also provided for the buffer rows 62 *c* and *d*. These flip-flops 246*a*, *b* and *e* will be in a "1" condition when its associated buffer row 62*a*, *b* and *e*, respectively, is loaded with data and in a "0" condition when such buffer row is empty. When one of the flip-flops, such as 246*a*, is set in the "1" or loaded condition, then data will not be permitted to enter the buffer row 62*a*. Accordingly, when the equipment is turned on, the TORP signal on line 273 will directly reset each of the entry flip-flops 246 *a*, *b* and *e* to the "0" condition. Subsequently, an enter data command signal on line 248 to the first buffer row 62*a* starts the train of data coming into the buffer 62. The enter data command signal on line 248, together with the simultaneous occurrence of the high-speed clock output pulse on line 234, will set the entry flip-flop 246*a* to the "1" condition via an entry gate 250*a*. Upon the setting of flip-flop 246*a*, a gate 252*a* is caused to clamp the entry gate 250*a* closed via the lines 249 and 251. With the gate 250*a* held closed, any further enter data commands on line 248 will not affect the flip-flop 246*a* while it is in the set condition. Thus, the setting of the flip-flop 246*a* holds the gates 252*a* and 250*a* in the closed or "off" condition in a manner which permits data to be entered into the buffer row 62*a* only once when the flip-flop 246*a* is set. Thereafter, an enter data command on line 248 will not affect the flip-flop 246*a* until it is reset to the "0" condition. Also, the setting of flip-flop 246*a* to the "1" condition removes the reset signal provided by the flip-flop 246*a* via gate 260*a* and line 254*a* to the storage flip-flops 259*a* of row 62*a*. In addition, when the flip-flop 246*a* is set to the "1" condition, eight acceptor gates 258 will be enabled via drive gate 262*a* and line 256*a* thereby permitting a nine-bit (seven data plus two mod bit) binary character to be entered in the buffer flip-flops 259*a* through such accepter gates 258*a* from the buffer input register 264 on lines 266*a–g*. A duobinary mod bit is received in the buffer 62 on line 266*h*.

As noted in the discussion of the high-speed clock 218, the clock 1 and clock 2 outputs on lines 232 and 234, respectively, consist of signal pulses occurring at the same frequency, but out of phase relation with each other. The setting of the flip-flop 246*a*, the removal of the buffer reset signal on line 254*a* and the enabling of acceptor gates 258, all occur during the clock 2 pulse time on line 234. The clock 1 and clock 2 signals alternately operate on alternate rows of the buffer 62 to shift data into and out of each row.

The setting of flip-flop 246*a* provides an enable signal on line 247 to the entry gate 250*b* to the flip-flop 246*b* in the adjacent lower row. This enable signal on line 247 operates on the buffer row 62*b* in essentially the same manner as the enter data command signal on line 248 to buffer row 62*a*. Accordingly, when the clock 1 pulse arrives on line 232 to the entry gate 250*b*, then the buffer row 62*b* undergoes the same procedure as discussed in reference to the upper row 62*a*, whereby the gate 250*b* is opened and the flip-flop 246*b* is set to the "1" condition to remove the reset signal on line 254*b* and enable the accepter gates 258*b* to permit entry of data from buffer row 62*a* into buffer flip-flops 259*b*. Thus, data is shifted into the buffer flip-flops 259*b* during the clock 1 pulse time. When the clock 1 pulse time ends, then the entry flip-flop 246*a* is reset via a line 253 and gate 255 to such flip-flop 246*a*. At this time, the reset line 254 is on and the data has been cleared out of buffer row 62*a* and the entry flip-flop 246*a* has been forced to the "0" condition. It is to be pointed out that if the lower logic control flip-flop 246*b* was initially in a "1" or loaded condition, then such flip-flop 246*b* could not have reset the upper flip-flop 246*a* to a "0" condition. In such case, data from the upper row 62*a* would not have been able to clear out of the upper row 62*a* and into the already loaded lower row.

Similarly, the next buffer row 62*c* receives an enable signal on line 257 from the upper adjacent flip-flop 246*b* and the process is repeated between rows 62*b* and *c*, and so on to row *d*. In this fashion, the use of the logic control entry gates and flip-flops 244*a–e* act as a steering mechanism to prevent a race condition whereby data is entered or written on top of existing data. In summary, where a lower row is empty then the high-speed clock pulses on lines 232, 234 will shift data from the row immediately above it down into the lower row. The state of the logic control entry flip-flop in the lower row determines if data from the adjacent upper row will be shifted below to permit new data to be entered into the upper row. The logic control entry flip-flop 246*e* in the very last or fifth row 62*e* is similarly set to the "1" condition by the clock 2 signal and the enable signal on line 267 from the adjacent upper row 62*d*.

However, the entry flip-flop 246*e* is not reset to the "0" condition by a signal from a lower adjacent row, but rather is reset by two signals Jo and J1 on lines 216 and 80. Signals Jo and J1 are produced when the data stored in the last buffer row 62*e* has been selected by the selected circuit 72 and sent out, and therefore can be discarded. More specifically, the signal Jo on line 216 is provided by the comparator 74, shown in FIG. 17, indicating that a valid comparison has been made by the select mechanism 72 between one of the nine dedicated equipments 52 and the SIP count of the SIP counter 76. The signal J1 on line 80 is provided by the select subscriber counter 78 which indicates that it is that particular dedicated equipment 52 which has been matched. With these two signals on lines 80 and 216 from the select mechanism 72 present, a gate 270 will be activated which in turn sets the flip-flop 246*e* to the "0" condition whereby all of the lower buffers 62*e* are cleared via a gate 260*e* and reset line 254*e*. These buffers 62*e* are connected to the Z-circuit 64 which, when the subscriber is in the send mode of operation, operates with a Z number on the character coming out of the buffer 62, in a manner more fully explained hereinafter. When the subscriber is in the receive mode of operation, the last row 62*e* of the buffer is connected to deliver data to the receptor's external terminal equipment 60.

Once again, it is to be pointed out that only during the first bit time is data for sending shifted into the last four rows 62 *b*, *c*, *d* and *e* of the storage buffer. And data, if any, can be entered only into the first row 62*a* when the logic control entry flip-flop 246*a* is in the "0" or empty condition. This is accomplished simply by turning on the high-speed clock signals to these rows only during the first bit time so as to prevent the occurrence of any data shift. Consequently, no new data will be permitted to enter on top of the character in the last row 62*e*. Thus, when a comparison has been detected between the particular dedicated equipment 52 and the SIP count, then the SI of this dedicated equipment 52 is entered during the first bit time and the signals on lines 80 and 216 indicating such comparison will be fed back to the flip-flop 246*e* in the last row to set it to the "0" condition.

The condition of the flip-flop 246*e* is continuously represented on the output line 271 which connects with the select mechanism 72 so that when the particular dedicated equipment is in the send mode and the signal on line 271 indicates that the flip-flop 246*e* is in the "0" or empty condition, then the select mechanism 72 need not look at this dedicated equipment 52 with its comparator 74. Also, the turn-on reset pulse (TORP) is also provided on line 273 to clear the buffers 62*e* and set them back to their original condition upon turn-on of equipment or termination of a message.

DATA INPUT REGISTER TO BUFFER STORE

The data input register 264 shown in FIG. 20 comprises essentially 7 buffer flip-flops 264*a–g* connected to receive incoming line information during the receive mode and also to receive data from the terminal equipment 60 for transmission during the send mode of operation.

When a dedicated equipment 52 is in the transmit mode of operation, all of data character bits are entered simultaneously and in parallel into the buffer 62. The select mechanism 72 of the common equipment 50 instructs the gates of the dedicated equipments 52 to present their data onto the common lines one subscriber at a time, at which time the comparator 74 compares this data with the SIP count. When in the send mode, the character stored in the last row 62*e* of the buffer is transformed by the Z-circuit 64 before being presented onto the common lines for comparison.

When a subscriber is in the receive mode of operation, the data on the incoming line is de-Z'd by the Z-circuit 64 before it is entered through the lines 266*a–g* into the buffer. Subsequently, the data in the buffer 62 can be processed from the binary form back into the symbol form in the subscriber's external terminal equipment 60.

Entry and receive gates 274*a–g*, respectively, are connected to each register flip-flop 264*a–g*, respectively, so as to receive the seven data bits simultaneously and in parallel during the receive mode of operation. When in the receive mode, the data entering these gates 274*a–g* will have been de-Z'd prior to passing through such gates into the data input register 264. Also, the gates 274*a–g* are enabled by a signal on line 276 from the terminal equipment 60 when such equipment is set to receive incoming data. When a subscriber is in the send mode of operation, data from a terminal, such as a teletype machine, may enter the input register 264 in serial form through an entry gate 278, as shown. Where a terminal equipment uses parallel entry, the input register 264 can be adapted to accept data in this form. Additional flip-flops, not shown, are provided in front of the first bit flip-flop 264*g* and in back of the last bit flip-flop 264*a* to serve as a start bit and a stop indicator whereby a designated combination of these bits such as all "0" 's are used to detect a full input register condition before data is entered from the data input register 264 into the buffer store 62. Serial data entering the input register 264 through entry gate 278 is shifted in by a clock signal on line 280 connected to each flip-flop 264*a–g*. When the input register 264 is loaded, the information stored therein can be detected on lines 266*a–g* for various purposes. For instance, all "ones" can be detected in the flip-flops 264*a–g* as an all "ones" check on the receipt by the receptor of the correct Z-number through the binary addition of the Z number sent by the originator and its complement sent back from the receptor's equipment, which sum is equivalent to all "ones" in binary form.

The outputs of the input register 264 are connected to the 5 character buffer store 62. However, before data is entered into the buffers, several conditions must exist, which together will provide the enter data enabling signal on line 248 to the buffer entry gate 250*a*, shown in FIG. 21. One condition is that the buffer control entry logic flip-flop 246*a* is in the "0" condition indicating that the first buffer row 62*a* is empty. Another condition is that the data input register 264 is full. Another condition is that the high-speed clock signal on line 232 from the clock 218 is present since data is entered into the buffer 62 only during this clock time. During the send mode, different conditions must be fulfilled before entry of data into the buffers, these being the presence of both a signal indicating that the particular subscriber is busy and a send enable signal indicating that the register 264 is full and ready for sending.

In addition to sending data through the entry gate 278 into the input register 264 to the buffer 62, data in the form of the M, P, and F numbers of a subscriber is sent on lines 282*a–g* respectively, through the entry gates 274*a–g*, respectively, to the input register 264.

BUFFER STORE SIGNAL PROCESSOR

These circuits, not shown, generally provide the logic timing and command signals for the buffer 62 and include circuits for those functions described previously. Some of these functions are an inhibit signal where the control entry flip-flop 246*e* of the buffer row 62*e* is filled with data, a request for handshake SIP, north and south-going command signals for steering information in the north or south directions in the system, a load shift register 54 signal, downshift and space gates for detecting the characters and sending their associated mod bits in the SI, mod bit send gates for setting the data mod bits into position in the buffer for sending the same, special control character decode signals for detecting control mod bits during the handshake mode of operation, and handshake time and My Si Is enabling signals for the buffer 62.

Referring more particularly to FIG. 20, the output lines 272*a–g* of buffer row 62*e* are connected to selected circuitry for detecting special characters. Special characters are assigned for subsequent transformation into the mod bit used with a SI, such as a downshift or space for a teletype machine. At the originator's end, the space or downshift command enters the buffer 62 as a seven-bit character and is detected and converted by means of a mod bit generator 275 into a space or downshift signal which eventually is sent out as a mod bit in the SI. In the same manner, at the receptor's end, these mod bits in the incoming SI are presented to the buffer 62 on line 266h and shifted until it passes out on line 284 to a space and shift generator 286 which decodes the duobinary mod bit and transforms it into a seven-bit character which is fed via lines 288*a–g* directly through the buffer output gates 290*a–g* and entry gates 296 to a data output register 292. In this fashion, the use of a mod bit provides substantial data or character compression since a separate character would otherwise have had to be transmitted to send space or downshift information. In this regard it is to be pointed out that this mod bit data can be sent as a separate character in cases where there is no character available into which the mod bit can be entered.

When in the receive mode of operation, the de-Z'd data that is shifted out of the last buffer row 62*e* passes via lines 272*a–g* through the buffer output gates 290*a–g* and entry gates 296 to the data output register 292. When in the send mode of operation, the data passes through a different circuit path, as shown by FIGS. 12 and 20. Generally, a source in the external terminal equipment 60 feeds the data to the data input register 264, the output of which is connected to the buffer store 62. Data from the buffer store 62 is operated on by the Z-circuit 64 and then compared by the select mechanism 72. When this data is selected, a SI is entered into the SIP corresponding to the matched character and placed on the transmission line 70 by the transmitter 56.

DATA OUTPUT REGISTER

The data output register 292 is essentially a shift register which operates during the receive mode of operation to transfer incoming data from the buffer store 62 to the external terminal equipment 60. When output register 292 is empty, then a command signal appears on line 294 from the equipment 60 to open the entry gates 296 to the output register 292. Data from the buffer store 62 is emptied into the output register in parallel form and thereafter is shifted and removed serially to the teletype machine in the external terminal equipment 60 by means of a clock signal on line 298. In the data equipment 60, this serial data is transformed back into its original symbol form.

Z-CIRCUITS

As previously described, the basic purpose for the Z-circuit 64 is to randomize the assigned text SIP's associated with the various characters, for each dedicated equipment 52, so that subscribers having identical original characters to transmit at the same time will have possibly all 128 text SIP's in which to transmit such character, as contrasted with having only one SIP available to all subscribers for a particular character.

Referring to FIGS. 22–24, the Z-number of an originator is sent to a receptor during the hand shake procedure between such two dedicated equipments 52. It is to be pointed out that while two such dedicated equipments 52 are in the handshake mode of operation, any of the other subscribers in the system can be simultaneously engaged in either the text mode of control logic circuit 166, and other common control signals for controlling traffic into the shift register. These signals are received by the direct write and clear gates 146 after the occurrence of the 5¾ bit time strobe signal, and during the time interval between the 5¾ and the one-bit time.

If none of the subscribers in a common equipment 50 have data to write into a particular SIP which carried data to one of the nine subscribers, then the shift register flip-flops 138*a–e* and 140*a–e* are cleared by entering all "ones" so that subscribers in any of the other eight common equipment 50 are able to write into that SIP. This is accomplished by first detecting the absence of data for a particular SIP by the select mechanism 72 which samples the subscribers and produces a direct clear signal 168 in its control logic circuit 166 when the select mechanism 72 has sampled no requests for that SIP. The direct clear signal is then applied on line 168 to the direct clear gates 146 which write all "ones" into the shift registers 54. On the other hand, where a subscriber's SI has been passed through the write entry gates 84 during a particular SIP in the period, and direct write signal 144 has been provided by the select control logic circuit 166 to the direct write gates 146, then this SI will be entered as data into the shift register 54.

Where loss of the carrier signal from oscillator 98 occurs, then the system is immediately aware of the fact that it can no longer depend on the period sequence or synch signals, the function of which will be explained in further detail hereinafter. Therefore, the next common equipment 50 along the transmission line 70 becomes the master clock with his carrier being used by the entire system. Accordingly, the direct write gates 146 of each common equipment 50 are wired on lines 170 and 162, respectively, for writing the synch signals and the period sequence count into the master shift register 54 at the appropriate time.

Loss of the carrier can be simply detected by a carrier loss detector 172 in the receiver 58 which provides a signal on line 174 to the period sequence counter 164 which enables such counter 164 to generate its own period sequence for the entire system. The carrier loss detect line 174 and the internal synch signal line 170 are gated together at 176 so that where the system loses the carrier signal, the first common equipment 50 to detect this will produce a carrier loss detect signal 174 which enables the internal synch signals and period sequence counter signals on lines 170 and 162, respectively, of such common equipment 50 to be entered into the shift register 54.

One of the two SOPI SIPS located at the beginning of each period has the second, third and fourth bits assigned for the synch signal while the first and fifth bits are assigned for the period sequence. The synch signal can be detected on these three level bits, respectively, as a "−1," a "0" and a "+1." The two bit period sequence counts to eight. Accordingly, where a carrier loss is detected, the common equipment 50 to detect this condition will provide the carrier signal from its own transmitter 56 for the entire system while at the same time such common equipment will produce a synch signal on line 170 to write synch signals into the second, third and fourth bit gates and the period sequence into the first and fifth bit gates of the direct write gates 146 to the shift register 54. The synch and the period sequence will be written into the first SOPI SIP of each period. In this manner the common equipment becomes the master clock for the entire system.

Referring to FIG. 18, there is illustrated the manner of detecting the synch by the synch detector 178. Where the synch has been coded as a "−1,""0" and"+1" in the second, third and fourth bits, then by connecting the six lines 180*a–f* to those output sides of shift register flip-flops 138*b–d* and 140*b–d* which will provide a "1" when the synch code is entered into these flip-flops, then an "AND" gate 182 and an inverter will decode the synch detect signal on line 184. Where a carrier loss is detected and consequently a synch code cannot be detected on the incoming line, the SIP counter 76, shown in FIG. 17, will be commanded to generate an internal synch signal on line 170 which is sent to the master shift register by way of the direct write gates 146. In addition to providing a synch signal on line 170 for writing into the shift register 54, the common equipment 50 also is similarly adapted to write a period sequence into the shift register. In any event, when carrier loss occurs, the system will detect this and immediately indicate that it cannot rely on the present period sequence or the line synch and thereafter will proceed to provide its own carrier signal, period sequence, and internal synch for the entire system.

SOPI AND SIP COUNTERS

As shown in greater detail in FIG. 17, these counters, referred to previously as SIP counters 76, consist of flip-flops and gates interconnected as a counter and driven by the derived master clock on line 100 coming from receiver 58. The SIP counter 76 includes a five-bit SIP count portion 186 adapted to produce output signals at chosen intervals in the five-bit SIP time including a SIP pulse upon the passage of every five clock pulses. For instance, a 5½ bit time pulse or strobe signal appears on output line 143 coming from portion 186 when a full SI and mod bit would occupy the shift register 54. The strobe signal on 143 occurs during the read interval between 5½ and 5¾ bit time. A 5¾ bit time strobe signal is provided on line 145 and lasts for the one-quarter bit time write interval. These strobe signals on lines 143 and 145 are used to enable the SI detection circuits 86, shown in FIG. 16, the select control logic 166, and the write entry gates 84, as well as other parts of the system. In turn, the SIP pulse is applied on line 188 to the SOPI counter 190 which is used to mark off the period of time in the period "P" which is known as the SOPI time immediately preceding the text SOP's. In this system, the first two SIP's or subperiods are occupied by the SOPI which, as noted previously, is coded to provide an indication as to the SIP'of each period and acts as a reference point for beginning the count of the succeeding 132 text and handshake time SIP's. After the SOPI counter 190 counts to two, it provides an enable signal on line 192 to the 132 count SIP counter 194, which enable is held for the duration of time in which the 132 SIP count occurs. After completion of the SIP count to 132, the SOPI counter 190 again counts for a period of time equal to two SIP's after which the 132 count begins in SIP counter 194. After a SIP count of 132, an end of period marker is reset to provide a reset pulse on line 196 to the 132 SIP counter 194 which waits for the two SOPI counts before beginning a new count. Thus, it is not until after the SOPI is counted that we begin counting the 132 SIP's. These two additional counts are to allow for the next SOPI which lasts for two SIP times and assures that we will be at the correct starting point when the first SIP count for the next period begins. The reset signal appearing on line 196 also provides the period sequence counter 164 with a pulse after each period, in the event that the period sequence signals on lines 197, 199 to the period sequence counter 164 should fail to provide the period sequence off the incoming line information. In addition, as known previously, the synch signal and the period sequence are generated within the SOPI time.

The 132 SIP counter 194 comprises an eight stage counter which is designed to be reset after a count of 132. These counters are advanced by one at every SIP count by the five-bit SIP counter 186 so that the SIP count comes up at the start and the end of SIP. The first 128 SIP's are designated as text SIP's. The last four counts are designated, in order, as (129) special SIP (130) service request (131) My SI Is and (132) control SIP. Special control lines 198, 200, 202 and 204, respectively, extend out of the counter 194 for individually indicating the presence of these last four SIP counts. Accordingly, when the counter is at 129 a special SIP signal can be supplied, at the count of 131 a My SI Is signal can be supplied, and at the count of 132 a control SIP signal can be supplied. Each of the eight stages also provides a SIP count binary output on eight lines 206*a–h* which is used throughout the system to provide SIP timing for inserting data at critical times into the master shift registers 54 and for determining the particular SIP in which incoming data was located.

One modification of the SIP counter 76 may include a divider circuit, not shown, which divides the 128 count by two, by four or otherwise so that the counter will readily be adapted for use with a 32- or 64-character teletype machine.

SELECT MECHANISM

The select mechanism 72, shown in FIG. 17, consists essentially of the comparator 74, the SIP count circuit 76, and the select subscriber counter 78 which sequentially looks at the character bits from each of the nine dedicated units 52 that is in the send mode. Eight master comparator "OR"-gates 208*a–h* are provided for each of the eight bits defining a single character. Since 128 text SIP's are provided, then each of the 128 text characters can be correlated with each of the 128 SIP counts. The eight bits in the SIP counter are compared with the eight data bits coming out of gates 208*a–h* from each of the nine users by gates 210*a–h* to produce a single pulse output through "AND"-gates 212*a,b,c* and 214 to indicate when there is present a character to send in a particular SIP. The comparator 74 generates a signal on line 216 which stops the select subscriber counter 78 thereby indicating which of the nine subscribers has this matched character. The select counter 78 is driven via line 232 by a high-speed clock 218, shown in FIG. 19, thereby enabling the select counter 78 to scan the nine subscriber units at a very fast rate. When stopped, the select counter 78 signals the SI enable gate 82 in the selected dedicated equipment 52 via one of lines 80. It is pointed out that there are two conditions which must be met before information is sent in a SIP. The first of these conditions is that there exists a character for the SIP to send. The second of these conditions is that the shift register SIP is empty or potentially empty. A shift register SIP is potentially empty when it is being received by the local common equipment destined for one of its dedicated equipments 52. Where a SIP is received by a common equipment 50 for one of its subscribers and there is no data to be entered in the SIP at that time by any of such subscribers, then the select control logic circuit 166, having received the received SIP signal on line 228 coming from the SI detection circuit, shown in FIG. 16, will provide the direct clear signal on line 168. This signal on line 168 is applied to the direct clear gates 146 to clear the shift register 54 and thereby permit entry by another common equipment 50 into the particular SIP.

Thus, the comparator 74 determines the first condition which is that there is a SIP to send for that particular SIP count. The SI detection circuit 86 determines the second condition that the SIP is empty or potentially empty. After the above two conditions are met an output is sent to the selected subscriber to indicate that it can now send. At the same time, this particular subscriber must be in the send mode of operation and must be signalling that he desires to transmit this particular information in his buffer.

SI DECODER

The SI detection circuitry 86, shown in FIG. 16, examines the SI in the shift register 54 to initially determine whether the incoming information should be directed to one of the nine subscribers associated with that particular adapter 48 and, secondly, to determine which of these nine subscribers should receive such information. To accomplish these functions, the decoder 86 detects the first two bits of the SI on lines 220*a*, *b* and 222*a*, *b* to determine the local adapter 48, and the third and fourth bits of the SI on lines 224*a*, *b* and 226*a*, *b* to determine the particular or dedicated equipment 52 to which the information is directed. The first two sets of bits may be thought of as zoning bits. Since we are working with a duobinary system, then apparently the nine adapters 48 as well as the nine dedicated units 52 within each of such adapters 48 can be determined by detecting these four bits. The detection circuitry 86 will generate a SIP received signal on line 228 when its local identification number appears in these first two bits and another signal identifying the particular dedicated equipment 52 will be produced which, together with the SIP received signal 228, will produce a SIT signal on one of the nine SIT lines 230*a–i* extending from the output of the SI detection circuit 86 to the nine dedicated equipments 52. The SIT pulse will be sent to only the one subscriber identified by the SI to indicate that "the SI in the SIP is yours." Then, the SIT signal will operate to enable the particular dedicated equipment 52 to utilize the incoming data in the shift register 54. The SIP received signal on line 228 also is fed to the select control logic circuit 166. While all nine dedicated equipments 52 within a local adapter 48 have the identical local bits designated, the last two bits are not shared among the nine dedicated equipments 52 but rather are assigned individually to each so that only the particular dedicated equipment 52 which is identified by both the local and the particular zoning bits will receive the information on the line.

CLOCK GENERATOR

Referring to FIG. 19, the clock generator 218 consists of a free-running, high-speed oscillator which provides two high-frequency clock outputs on lines 232 and 234, respectively, having the same frequency but displaced in time from each other by means of gates 240 and 242. The clock outputs on lines 232 and 234 are periodically turned on and off by two timing signals on lines 236, 238 coming from the five-bit SIP counter 186, which signals turn the clock output signals on and off at the appropriate times. One function of the clock 218 is to shift data into and out of the storage buffers 62 of the dedicated equipment 52. Another function of the clock 218 is to drive the select subscriber counter 78 so that it scans the data presented for sending by the nine dedicated subscribers at a very high rate. It is to be pointed out that these storage buffers 62 are not to be confused with the master shift register 54 of the common equipment 50.

The storage buffers 62 of the dedicated equipment 52 comprise a five-character buffer unit into which data is entered into the first row after the data in the first row has been shifted to the second row, and so on down to the last row where the data there was emptied out of the buffer 62. Each alternate row of flip-flops has one of the two high-speed clock signals on lines 232, 234 applied for purposes of shifting data out of the buffer rows while the intermediate row has the other of the two high-speed clock signals applied to shift data into the emptied out rows. When a dedicated equipment is in the send mode of operation, data will be removed from the last buffer row during the send fifth bit time upon being selected by the common equipment 50 to enter its SI into the particular SIP representing the data character. Bearing in mind the fact that data can be removed from the last buffer row only during the send fifth bit time when a complete five-bit SIP appears in the master shift register 54, one can understand that it is important that no new data be shifted into the last buffer row at this time, since such new data would be entered on top of the last character in such row thereby destroying the previous character before it was transmitted in a SIP. Accordingly, the high-speed clock outputs on lines 232 and 234 can be turned on at times other than the fifth bit time, such as during the first bit time only, by applying the timing signals on lines 236 and 238, from the five-bit SIP counter 186, to the output gates 240 and 242. Thus, during the fifth bit time no data would be shifted by the clock 218 into the last four rows. However, data may be entered into the first row, if it is empty, as will be more fully explained hereinafter.

DEDICATED EQUIPMENT BUFFER STORE

Referring to FIGS. 20 and 21, a five-character buffer store is provided having accommodation for a seven-bit character plus one duobinary mod bit. When a subscriber is in the send mode of operation, a logic control entry gate and flip-flop 244*a–e* are enabled for each character or row 62*a–e*, respectively, of the buffer 62 to permit or deny entry of data into each associated row depending on whether the row is empty or full. FIG. 21 shows the logic control entry gates and flipoperation or the hand shake mode and communicating text information within the same period P as the two dedicated equipments 52 engaged in the handshake mode of operation. Thus, the 128 text SIP's will have one meaning, in the handshaking sense, as between the two handshaking dedicated equipments 52 while at the same time these SIP's will be accompanied by a different meaning in the text sense, for the remaining dedicated equipments 52. For instance, during the handshake procedure the receptor at some designated time will learn the Z number of the originator by sending the receptor's SI to the receptor in a particular SIP in the period P. At the receptor's end, this Z number is simply the SIP count on lines 301*a–g* to the circuit 64 at the time the SIT pulse appears on lines 303. Thus, the SI arrives in the SIP which represents the Z number. For instance, during handshaking, if you have a Z number equal to 9, it can be transmitted by sending out the receptor's SI in the ninth SIP, and upon receipt the Z number will be entered into a Z number store 300 as a numeral 9.

A further refinement in the application of the Z number is the use of the period sequence counter 164 which is designed to simultaneously change the Z number used by two subscribers at every period and for a total of eight periods after which the Z number sequence repeats itself. For instance, the seven binary bits representing the Z number can be laterally shifted once each period. Other patterns of Z number variation may also be employed. In this case, during the first four counts of an eight-period sequence count, the Z number is systematically changed. During the last four periods, however, the complement of the original Z number taken in binary form can be altered in the same fashion and sequence as the original Z number in the first four counts. Accordingly, during the first and fifth periods of the period sequence counter 164, the Z number complement and the Z number, respectively, are used.

Connected to the Z circuit 64 are seven lines 301*a–g* of the eight-bit SIP counter 76, as shown in FIGS. 22 and 23. The SIP count lines 301*a–g* are also connected to the seven-stage Z number store 300. An enable gate 302 enables the entry and storage of a Z number during either the send or receive mode of operation. During the handshake procedure, the receptor receives the Z number as a SIP count and simply stores it in the Z store 300. The receptor also produces the complement of this Z number in a Z number shifter 304 and returns the Z complement to the originator. Subsequently, the originator adds the Z number with the returned Z complement by means of an adder circuit 306 which should produce a total of all "ones" as a check on the receipt by the receptor of the correct Z number. During the text time between the two subscribers, this stored Z number in Z-store 300 will operate on any incoming data being received by the receptor by adding the Z number to the SIP count in which the incoming SI appeared to obtain the original character transmitted by the originator's external terminal equipment 60. The period sequence counter 164 further operates on the stored Z number by means of the Z number shifter 304. When the SIP counter 76 indicates which particular SIP was received during text time, the adder circuit 306 will add the SIP count of the incoming information to the period sequence Z number to obtain the original SIP count or character on lines 266*a–g* going to the buffer store 62.

In the Z circuit 64, the input binary character is added to a second binary number, in this case a Z number, by a process which throws away any carry bits to obtain a new number (Z'd number). This addition can be accomplished by an exclusive "OR"-gate 308, shown in FIG. 24, wherein a "0" plus a "1" provide a "1" output, and a "0" plus a "0" or a "1" plus a "1" provide a "0" output. If this sum (Z'd number) is again added to the original number, then the resulting sum will be identical to the original number (de-Z'd). For instance, where a number, such as the number 5 and represented in binary form as 101 is added to a Z number equal to 3, represented in binary form as 011, then the resultant binary number will equal 110, having dropped any carry bits. This Z'd number might have the sixth SIP assigned to it when it is sent by the originator's dedicated equipment 52. At the receptor's end, when the Z'd number 110 has the same Z number 011 added to it, the resultant character (de-Z'd number) will equal a binary number of 101 which is identical to the original binary number of character of 5 which was sent by the originator. This is the manner in which the exclusive "OR"-gates 306 of the Z-circuit 64 are employed to provide a Z'd character for transmission to the receptor and then to transform or de-Z this character back to the original character for use by the receptor's external terminal equipment 60.

In summary, a character is transmitted by the originator by entering data from the originator's external terminal equipment 60 into the buffer store 62. The output of the buffer store 62 is connected to the Z-circuit 64 where the SIP count associated with the word leaving the buffer will have added to it the Z number by means of the exclusive "OR" gates 306 of the Z-circuit 64. The resulting Z'd character will be compared with the SIP count from SIP counter 76 of the select mechanism 72. When a match occurs, the receptor's SI will be entered into the master shift register 54 in a SIP corresponding to the matched character, after which it is sent through the duobinary to ternary transmitter 56 to the receptor's dedicated equipment 52. When this incoming data is received at the receptor's end, it is still the Z'd character and therefore must be de-Z'd before it can be meaningful to the receptor's external terminal equipment 60. Consequently, the Z'd character, represented by the SIP count, is again added to the Z number stored in the receptor's Z-circuit 64. To obtain the original character, the resultant original character leaving the Z-circuit 64 is applied to the receptor's buffer store 62 where it is processed and eventually sent to the receptor's equipment 60 and transformed into its original typewritten character form.

During the handshake mode of operation, the pure Z number will be transmitted by the originator as a part of a fixed sequence. This is done simply by providing the last buffer row 62*e* empty so that the buffer 62 will provide no SIP count and thus no data to be added to the Z number.

As noted previously, when a Z number has been received during the handshake mode of operation, eight different Z numbers will be sequentially derived and applied during the eight periods counted by the period sequence counter 164. Since the Z number is used to get a more uniform distribution of data, such uniform distribution is further assured by varying the apparent Z number during each of these eight periods, thus making the chance of the various subscriber units having the same Z number at a particular time become further remote. It is to be pointed out that the handshake procedure is set up so that the Z number is transmitted at a designated time in this procedure. Transmission of Z number is accomplished by first setting the condition of the flip-flop 246*e* in the last buffer row 62*e* to a "1" to enable sending. At this time, the empty last row 62*e* is sent out together with the Z number of the originator, which results in the pure Z number being transmitted. In other words, during the Z number transmission time of the handshaking procedure the pure Z number is sent out without any other data added thereto.

Also, during the handshake procedure when the receptor receives the originator's Z number it is entered into the Z store 300 and the period sequence counter 164 will be set into its first period. As illustrated by FIG. 22, the complement of the received Z number is sent back to the originator who adds it in his Z-circuit 64. The sum of the originator's Z number and the Z complement should equal all "ones." This checking procedure enables a subscriber to send a Z number without having to consider what the specific Z number was since his checking circuit will produce an all "ones" output indicating the correct Z number was transmitted and received at the other end. During transmission of the Z complement a Z complement enable gate 310 was held open, and upon release of this hold signal, the entire Z circuit 64 operates off of the period sequence counter 164 in a similar manner to transmit 4 different Z numbers plus their complements totaling eight different Z numbers by sequentially providing signals to a plurality of enabling gates in the Z number shifter 304 for making different Z numbers.

HANDSHAKE PROCEDURE

The handshake procedure is a mode of operation in which the involved pair of dedicated equipments 52 are not transmitting textual data to one another but rather are establishing communication preparatory to the actual data transmission. After the handshake procedure is completed, the two dedicated equipments 52 automatically transfer from this operation to the text mode of operation.

Any of a large variety of handshake procedures can be employed. One procedure could be unique for some users which such procedure could be designed with different steps and other sequences for other users, and consequently, different handshake procedures can be used between different users.

In one handshake procedure, shown in FIGS. 25A and B, there are three conditions which must exist before the handshake message can be initiated. The first requirement is that the originator's data equipment 60 is off-hook, the second that the originator's SI storage circuit 68 is loaded with the receptor's SI, accomplished by opening the load gates 312 to such storage circuit 68 and clocking in the four SI bits, and the third that the originator's equipment 52 has detected the loaded SI storage circuit 68 be detector 314 indicating that it has the complete address before proceeding further. These three conditions constitute the first logic sequence 316 in the handshake procedure after which the originator's equipment is placed in the busy mode. Upon the detection of a loaded SI condition, a dedicated equipment occupied signal, referred to as "dA occupied," on line 318 assures that no other subscriber can start a handshake sequence with the originator. At this time, a send enable signal is sent on line 320 to the common equipment 50 instructing that you wish to send data, together with a service request signal on line 322 which in effect is a request that the originator's SI be entered in SIP 130. In this handshake procedure, the sequence employed is one in which the 130th SIP in the period is assigned to the request service wherein the originator sends out the receptor's SI which is readily detected by such receptor at the other end. The 131st SIP is assigned to the "My Si Is" operation wherein the originator sends his own SI to the receptor for storage in the receptor's SI storage circuit 68, and the 132nd SIP is assigned as to the control SIP for sending acknowledge, terminate, end of heading and error A and B signals. Receipt by the receptor of the SI sent by the originator in the 130th SIP automatically informs the receptor that he must immediately observe the 131st SIP so as to read and store the originator's SI, entered therein. During the 130th SIP, the receptor receives a SIT signal on line 324 from the common equipment 50 which opens his SI store 68 so that the information contained within the 131st SIP is automatically stored. During the service request, the originator's circuitry automatically provides an enable signal to the originator's SI enable gate 82, shown in FIG. 12, to permit the originator's SI to be entered by the common equipment 50 into the 131st SIP.

The dedicated equipment 52 is set up so that the SI stored in the storage circuit 68 is always the SI of another dedicated equipment 52 with whom you are communicating. Accordingly, the SI detector 86 in a common equipment 50 is designed to detect only those SI signals identifying its own associated subscribers. However, each dedicated equipment is connected to a SI wired into its circuitry, shown as originator SI generator 66 in FIG. 12, and adapted to be enabled and sent out with the "My SI Is" SIP upon occurrence of a service request. Obviously, it is important that a receptor known the SI of the originator for purposes of addressing and communicating data back to the originator. For this reason, the receptor stores the originator's SI. During the 131st SIP, the entry gates to the receptor's SI storage circuit 68 are opened so that the incoming bits from the master shift register 54 enter such storage circuit 68. When the four bits have been entered in the SI storage circuit 68, a full SI condition is detected and a signal produced to provide on line 318 a dA occupied signal so entry into the receptor's SI storage circuit 68 by other subscribers is denied. When the receptor has stored the originator's SI, the "dA occupied" signal generated on line 318 by the receptor causes an acknowledge signal on line 326 to be sent back to the originator.

The acknowledge signal on line 326 is used to start a Z M P F sequencer 328 in the originator's equipment. Initiation of the sequencer control logic in circuits 330, 332, 334 and 336 starts the second logic sequence of the handshake procedure wherein an enter M number command signal is generated on line 338 to an MPF generator 412. MPF generator 412 is connected to the command output lines 338, 342 and 346 of the ZMPF sequencer 328 and respectively provides an M, P, or F number which appears on the seven output lines of the generator 412 leading to buffer store 62.

At this time, the originator sends his M number by placing his SI into the one of the 128 text SIP's which corresponds with his M number, such as in the 19th SIP corresponding an M number 19. Upon receipt of this M number, the receptor sends back the received M number to the originator, together with a mod bit compatibility signal which indicates whether the receptor's machine can talk, listen or both talk and listen to the originator's machine. When the originator receives the returned M number a signal on line 340 operates the next sequence by setting the originator's ZMPF sequencer 328 into the third sequence wherein an enter P number command signal is generated on line 342 to the MPF generator 412. In a similar fashion, the receptor sends back to the originator the received P number and its associated mod bit compatibility signal from which a received P number signal on line 344 sets the originator's ZMPF sequencer 328 to the fourth sequence. During the fourth sequence, a command signal on line 346 to the MPF generator 412 will operate to send the originator's F number to the receptor. After the received F number acknowledgement signal on line 348 from the receptor appears at the originator's equipment, such signal will act to turn off the Z M P F sequencer 328 through gates 350 and 352 while at the same time releasing an inhibit Z number signal on line 354, which was constantly on while the Z M P F sequencer 328 was operating. Upon release of this inhibit signal, the Z storage buffer 300 is now permitted to enter the Z number for transmission.

It is to be pointed out once again that this sequence is designed so that the M, P, F, and Z numbers will be sent to the receptor in a predetermined order so that the receptor's equipment can automatically attach a meaning to these numbers upon receipt thereof.

THE RECEPTOR'S HANDSHAKE SEQUENCER

Referring more particularly to FIG. 25B, after the "dA occupied" signal on line 218 is produced, the receptor automatically is on notice that the next SIT pulse received by the receptor from the common equipment 50 will be the M number. The simultaneous occurrence of both the "dA occupied signal" and this SIT pulse on lines 318 and 324, respectively, will open a sequencer entry gate 356 to the receptor's hand shake logic sequencer 358. After the sequence entry gate 356 is opened, a sequence for both receptor and the originator is initiated and a sequence 2 logic gate 360 is opened to command the receptor to receive and enter the incoming M number. Opening of the sequence 2 logic gate 360 also produces an enable signal to permit opening of a sequence 3 logic gate 362 when the next SIT pulse appears on line 324 at the sequencer entry gate 356. This next SIT pulse will thus cause the gate 362 to provide a command to the receptor to receive and enter the P number coming from the originator. When sequence 3 logic gate 362 is opened, a reset signal is produced to close the sequence 2 logic gate 360 thereby preventing the next SIT pulse from entering the incoming data as an M number. Similarly, the sequence 3 logic gate 362 will provide an enable signal to a sequence 4 logic gate 364 which also resets the sequence 3 logic gate 362 and command the receptor to receive and enter the F number coming from the originator. In actuality, the command signals produced by the sequence logic gates 360, 362 and 364 instruct the receptor that the SIP or SIP count in which this SI is presently coming in on and for which a SIT pulse was provided is the M, or P, or F number, respectively, of the originator.

After the sequence 4 logic gate 364 is opened, an enable signal is sent out to a sequence 5 logic gate 366 which subsequently provides a reset signal to gate 364. The next SIT pulse will then operate the sequence 5 logic gate 366 and produce an enable signal for the detection and control circuitry 368 of the receptor's handshake sequencer 358. The sequence detection and control circuit 368 receives both the sequence 5 logic enable signal on line 370 plus either a receive or send command signal on lines 372 and 374, respectively, depending on the mode that the receptor is operating in and provides a command signal on line 376 to the Z-circuit 64 to store the Z number sent out by the originator. The sequence detection and control circuit 368 also receives a 132 SIP time signal on line 378 derived from the SIP counter 76. Upon the simultaneous occurrence of this 132 SIP time signal and the SIT pulse on line 324 during the handshake procedure, then the receptor will receive a mode bit indicating either an "acknowledge,"and "end of handshake" or a "terminate" signal on lines 381, 380 or 382, respectively. Where an "end of handshake" signal is received from the originator's equipment the receptor will be placed into the text mode and a text time signal will enter a Z logic circuit 384 connected to the sequence detection and control circuit 368. During text time the outputs from the detection and control 368 can be used by the receptor to check for errors in the transmission of the SI by means of an error circuit 379. For instance, if any of the SI bits should be altered, as by noise on the lines, the SI will be misdirected to a dedicated equipment 52 other than the intended receptor thereby resulting in incorrect data transmission. One manner of checking for such errors is to have the receptor count the number of SIT pulses received on line 386 and send back an indication of the total number of characters received during a communication so that the originator can check this number with this own tabulation. This Z logic circuit 384 provides a signal on line 386 which indicates the failure of the Z number to arrive, and signals on lines 388, 390, 392 and 394 for holding or releasing the Z number and its complement from storage.

Referring to FIG. 26, the 132nd SIP is assigned as the control SIP and as such is used during the handshake time to send "acknowledge,""terminate" or "end of handshake" signals. These three signals are generated in the mod bit of the 132nd SIP. A control SIP mod bit generator 396 is provided in the receptor's handshake logic circuit for receiving the "send terminate," "send end of handshake" (EOH) and the reset or "-TORP" signal on lines 398, 400 and 402, respectively. The TORP signal is generated whenever a terminate has been sent and provides a reset signal which clears all the registers of the dedicated equipment 52 to set them back into their original condition, such as the receptor's sequence logic gates 358, which were individually locked after the particular sequence occurred. Also, during turn-on time of a dedicated equipment 52, a reset signal in the form of a TORP is sent. Thus the TORP signal is sent whenever turn-on of equipment occurs and when a total message has been completed. Upon receipt of the above signals, the control SIP mod bit generator 396 provides the two duobinary lines 404 and 406 on which the mod bit is sent, as well as a control request signal on line 408 requesting that the data be placed in the 132nd SIP. Generator 396 also provides a command signal on line 410 to the sequence logic circuits of the dedicated equipment 52 to indicate that the receptor has sent a terminate. Where the receptor has either sent or received a terminate signal, then a TORP signal will be generated.

M P F VALIDATION CIRCUITRY

Whenever a M, P, or F number is sent by the originator, the receptor returns the M, P or F number respectively, so that the originator can confirm the receipt of the correct number. Assuming that the originator has a M number of 8 and sends this in the eighth SIP ordinarily, the receptor would receive a SIT pulse during the eighth SIP count. Referring to FIG. 27, the receptor is provided with a count marker 414 which is preprogrammed with the receptor's compatibility with various M, P and F numbers of other subscribers. More specifically, the count marker 414 receives the SIP count from the SIP counter corresponding with the M, P or F number of the originator and applies this number or count to a preprogrammed matrix of M, P or F numbers with which the receptor is compatible, in varying degrees. Since the receptor's external data equipment, such as a teletype machine, may be designed with a format that can talk only to certain type machines, listen only to others, and both talk and listen to still other machines, then it is important that the two handshaking subscribers be informed of the nature of their compatibility. Accordingly, this matrix is programmed with fixed positions or counts corresponding to several M numbers, P numbers and F numbers. Each of these fixed positions is respectively connected to one of the M lines 416 *a*, *b* and *c*, the P lines 418 *a*, *b* and *c*, or the F lines 420 *a*, *b* and *c* coming out of the count marker 414. An M, P or F number is received by the count marker 414 in the fixed count coinciding with such number and automatically placed on one of the output lines, according to the pre-programmed compatibility. For example, assume that an M number equal to eight is sent by the originator and received in the receptor's count marker 414. This M number appears as a pulse in the eighth count in the matrix of the count marker 414. Depending on whether the receptor's machine can talk only, listen only, or both talk and listen, respectively, to a machine having an M number of eight, this pulse in the eighth count will appear on one of the lines 416 *a*, 416 *b* or 416 *c*, respectively.

The output lines of count marker 414 are connected to MPF selecting gates 422 which also receives an M, P or F number select signal on lines 430, 432 or 434, respectively. Selecting gates 422 also receive signals arriving on lines 429, 431 and 433 during the SIP times in which the M, P and F numbers, respectively, are received. In turn, the selecting gates 422 provide an output signal on line 424 *a*, *b* or *c* for either the M, P or F numbers indicating whether the talk, listen or talk and listen condition exists. These three gate output lines are connected to a mod bit case detector 426 which in turn provides signals to a mod bit generator. During the handshake time, the receptor's mod bit generator 428 will be enabled by a handshake time (HST) signal on line 436 and by a "not originator" subscriber signal on line 438 to produce the mod bit for the M, P or F numbers, which mod bits are stored in a mod bit store 440. The mod bit store 440 holds such mod bits until it receives a SIT pulse, at which time it sends the mod bit on lines 442 and 444 to the data storage buffer 62 for transmission together with the M, P or F number back to the originator.

As noted previously, the originator receives the M, P or F number that he previously sent to the receptor, together with a duobinary mod bit produced by the receptor in mod bit generator 428. Obviously, since the receptor previously provided the mod bit on lines 446, 448 entering the originator's steering circuit 441, then the originator need not use the generator 412, the originator's mod bit generator 428 is not enabled on line 438 so that the mod bit received on lines 446, 448 passes undisturbed to the mod bit store 440. In fact, inasmuch as the handshake procedure is designed in a manner whereby the originator receives his own M, P or F number off the incoming line, the originator's count marker 414 and selecting gates 422 would necessarily produce a talk and listen output signal on lines 416 *c* and 424 *c*.

Other circuits employed in the MPF validation circuits include a mod bit logic circuit 435 which provides an "MPF O.K." signal on line 437 when the correct M, P and F numbers are returned. Also where an M, P or F number has not been received by a subscriber, then a "SEND TERMINATE" command is provided in the MPF validation circuits.

At the originator's end, the duobinary mod bit signals received with the M, P and F numbers are applied via lines 442, 444 to a mod bit converter 450 to detect the one of three conditions which applies between the receptor and his own equipment. The converter 450 outputs are held in a mod bit case store 542 for detection by a lamp logic circuit 454 which is used to illuminate the originator's mod bit lamps 456 and 458 to indicate the talk, listen, or talk and listen conditions. The lamp logic of the originator's circuit 454 is inverted by a signal on line 455 in a manner which illuminates those lamps applicable to the originator's condition with respect to the receptor. For example, if the receptor's lamps 456, 458 should indicate a "can talk" to originator condition, then the orginator's lamps will indicate a "can listen" to receptor condition.

At the receptor's end, the mod bits associated with the M, P and F numbers and produced by means of count marker 414, selecting gates 422, case detector 426 and generator 428 are provided on lines 442 and 444 for both the purpose of sending on the transmission line to the originator and for illuminating the receptor's lamps 456 and 458.

Although the above description is directed to preferred embodiments of the invention, it is noted that other variations and modifications will be apparent to those skilled in the art and, therefore, may be made without departing from the spirit and scope of the present disclosure. For example, while the system described in detail hereinabove comprises a linear network having all of its adapters connected along its length, as illustrated by the FIG. 11, the concepts of the present invention also apply to nonlinear networks which extend the system coverage to an area, howsoever large. Such nonlinear networks are connected together by nodes having a total of at least three input and output lines. A simple node can be arranged so that data arriving over two sets of lines is transferred to another pair of lines leaving the node. The data may be transferred to the outgoing lines on the basis of selected whole periods P by employing a period alternating technology (PAT) concept.

The period alternating technology concept utilizes the start os period indicator (SOPI) which, as previously discussed, includes fixed synch bits for identifying the beginning of a period, and variable or sequence bits for repetitively counting to a fixed number. The SOPI also includes boxing" bits for conveying internal system information, such as: (a) "this period is for area X"; (b) "all Si in this period have as their first bit a.........(one, zero) which is not included in the SIP"; (c) "accept no messages of priority less than----"; (d) "unit-----report-----"; and (e) "unit ------ do -----." Furthermore this data can be arranged to arrive alternately in periods $P_a$, $P_b$, $P_a$, $P_b$----- over one line and in periods $P_c$, $P_d$, $P_c$, $P_d$----- over the other line. $P_a$ and $P_c$ may be simultaneous (or made so by the aid of delay lines) as may $P_b$ and $P_d$. The equipment in the node can be arranged to select P's alternately from each incoming line and transfer them to one of the outgoing lines. Therefore one outgoing line has $P_a$, $P_c$, $P_a$, $P_c$ ---- occurring alternately and the other outgoing line has $P_b$, $P_d$, $P_b$, $P_d$, - - -. Since the SOPI indicates, by boxing, the area destination of the information in each period, the equipment in the system can select the appropriate period in which to convey the data to the correct destination.

The simple basic PAT concept can be expanded into large networks transferring data from very many sources to very many destinations with no need for functionally complex equipments. Preliminary work has shown that large networks can be connected to many other large networks by this means if it is desired to build far-reaching systems.

We claim:

1. The method of transferring messages from one to another of a plurality of stations in a communications network, comprising:

assigning message meanings individually to each of the multiplicity of discrete subperiods within a period (P);

at the sending stations, determining whether the subperiods are available for use;

holding one or more message meanings to be communicated until subperiods corresponding to said held message meanings are available for use; and inserting into the selected available subperiods for sending along a transmission medium, signals identifying at least one of the receiving and/or sending stations;

whereby a receiving station, may detect identifying signals and derive the message meanings corresponding to the subperiods in which said identifying signals are detected.

2. The method as in claim 1, including:

shifting, for two or more stations, the sending of the identifying signals from subperiods of proper message meanings to other subperiods; and, at the receiving station, restoring the proper message meanings;

whereby the assignment of message meanings is the same or different for each of the plurality of stations, with assignment of said message meanings being the same for at least those stations communicating with each other at a given time.

3. The method of transferring messages from one to another of a plurality of stations in a communications network, comprising:

assigning message meanings individually to each of a multiplicity of discrete subperiods within each of one or more periods (P);

indicating a reference point in the period (P) for the stations to synchronize the periods and to synchronously relate the occurrence of said discrete subperiods;

determining whether subperiods are available for use;

holding the message meanings to be communicated until subperiods corresponding to said held message meanings are available; and inserting into the selected available subperiods for sending along a transmission medium, signals identifying at least one of the receiving and/or sending stations;

whereby a receiving station may detect such identifying signals and derive the message meanings corresponding to the selected subperiods in which said identifying signals are detected.

4. The method as in claim 3, including:

shifting, for two or more stations, the sending of the identifying signals from subperiods of proper message meaning to other subperiods;

and, at the receiving station, restoring the proper message meanings;

whereby the same or different message meanings may be assigned to each of the discrete subperiods for the different stations, said message meaning assignment being the same for any two or more communicating stations.

5. The method as in claim 3, wherein handshaking messages are transformed from one station to another station for the initiation and establishment of communications between two or more stations, comprising the steps of:

assigning a first subperiod in the period (P) for communicating a request for service wherein an originator station inserts in said subperiod the receptor's identifying signals, and sending said identifying signal;

assigning a second subperiod in the period (P) for the originator station to send his own identifying signal, and sending said identifying signal; and at the receptor's end, detecting said receptor identifying signal in said first subperiod, and receiving and storing the originator's identifying signal in said second subperiod;

whereby the receipt by the receptor of signals in the first subperiod assigned to requests for service, automatically informs said receptor that he must receive and store the originator's identifying signal located in said second subperiod.

6. The method as in claim 5, including:

assigning a subperiod of the period (P) for inserting identifying signals together with signals indicating control information.

7. The method as in claim 5, including:

sending, along with the identifying signals, separate modification signals for indicating control information.

8. The method as in claim 5, including:

sending, from the originator station, signals identifying particular types of machines or facilities located at the originator's station and their communication capabilities; and receiving, at a receptor station, said signals and, in response, sending information for indicating the communication capabilities or the degree of communication compatibility between the machines or facilities of the originator station and the machines or facilities of the receptor station;

whereby said degree of compatibility relates to whether the stations can operate under one way or two way communication, or whether such station's machines or facilities are of such type as to be unable to communicate with each other.

9. The method as in claim 8, wherein the particular type of machine or facility is identified by assigning subperiods individually to each type of machine or facility in the system, and inserting signals identifying originator or receptor stations into selected subperiods having meanings correlated with the particular type of machine or facility used at a given station.

10. The method as in claim 8, wherein the information for indicating the communication capabilities or degree of communication compatibility between the machines of the originator station and the machines of the receptor station is sent as separate modification signals together with said identifying signals in selected subperiods, whereby the station receiving modification signals can determine the communication compatibility of the machines.

11. The method as in claim 5, including:

assigning priority numbers to stations for purposes of establishing communications priority;

notifying stations of the priority numbers of other stations for purposes of establishing priority of users; and controlling the use by the different stations of the subperiods within a period (P) by permitting or denying entry of identifying signals into said subperiods on a priority basis.

12. The method as in claim 3, including:

assigning control information meanings to one or more modification signals; and sending modification signals in addition to and together with said identifying signals in selected subperiods;

whereby the station detecting said identifying signals will also detect said modification signals and derive the control information corresponding thereto.

13. The method as in claim 12, wherein said control information meanings represent downshift or space characters assigned to said modification signals.

14. The method as in claim 12, wherein the modification signals serve to modify the message meaning corresponding to the discrete subperiod in which both the modification signals and the identification signals are sent.

15. The method of transferring messages from one to another of a plurality of stations in a communications network, wherein one or more stations are connected to both receive and transmit signals along a single transmission path, comprising:

at the stations, assigning message meanings to each of a multiplicity of discrete subperiods within each of one or more periods (P) passing through at least one station on the transmission path;

at one or more sending stations, storing the message meanings to be transmitted;

at one or more sending stations, comparing said stored message meanings to be transferred with respective ones of available subperiods having corresponding message meaning assignments;

determining the availability of subperiods at a sending station location on the transmission path by detecting whether desired subperiods contain data for other stations located at other points along the transmission medium;

at one or more sending stations, inserting station identifying signals onto the selected available subperiods for sending along the transmission medium;

at one or more receiving stations, detecting assigned station identifying signals on the transmission medium and correlating the discrete subperiods in which said identifying signals are detected with their respective assigned message meanings; and at said receiving stations, substituting the detected station identifying signals with a subperiod availability signal code which indicates to other stations along the transmission medium that the so indicated subperiod is available for use by other stations.

16. The method of transferring messages from one to another of a plurality of stations in a communications network, comprising:

generating count numbers indicative of the occurrence of each of a multiplicity of discrete subperiods within a period (P), the counting being repeated for each period (P), each period (P) being constituted by a known number of subperiods;

at a sending station, correlating each of a plurality of message meanings to be transferred with message representative numbers, said message representative numbers in turn being correlated with said subperiod count numbers;

comparing the subperiod count numbers with the message representative numbers;

and, at a sending station, inserting into selected subperiods station identifying signals, said subperiods being selected where its subperiod count number corresponds to the message representative number;

whereby a receiving station may, in response to such station identifying signals, derive the message meanings corresponding to the discrete subperiods in which such signals occur.

17. The method as in claim 16, including at a receiving station, the steps of:

detecting said station identifying signals;

deriving subperiod count numbers indicative of the occurrence of the received subperiods; and correlating the subperiod count numbers of the subperiods having said identifying signals inserted therein with the message meanings assigned thereto.

18. The method as in claim 17, in which the station identifying signal identifies the sending station.

19. The method as in claim 17, in which the station identifying signal identifies the receiving station.

20. The method as in claim 17, including:

shifting, at the sending station, the sending of the station identifying signal from a discrete subperiod of proper message meaning to another discrete subperiod;

and, at the receiving station, restoring the proper message meaning.

21. The method as in claim 16, in which the station identifying signal identifies the sending station.

22. The method as in claim 16, in which the station identifying signal identifies the receiving station.

23. The method as in claim 16, including:

shifting the sending of the station identifying signal from a discrete subperiod of proper message meaning to another discrete subperiod wherein it is sent.

24. The method as in claim 23, in which the amount of shifting is frequently changed in order to make more uniform use of the discrete subperiods.

25. The method as in claim 24, in which the amount of shifting is frequently changed in order to make more uniform use of the discrete subperiods.

26. The method as in claim 16, including:

sending, from an originator station, station identifying signals in a subperiod, and storing the subperiod count number in binary form;

receiving, at a receptor station, the station identifying signals, and detecting the subperiod count number associated with the subperiod having said signals;

at said receptor station, sending back to said originator station, station identifying signals in the subperiod representing the binary inverted complement of said stored subperiod count number; and at said originating station, detecting station identifying signals and the count number of the subperiod having said identifying signals, the latter count number representing the binary inverted complement of said stored subperiod count number, and adding said complement to said stored subperiod count number;

whereby the sum of said binary inverted complement and said stored subperiod count number will equal a known binary number where there have been no errors in transmission of messages. 27. A system for transferring messages from one to another of a plurality of stations in a communications network, comprising:

means for recognizing each of a multiplicity of discrete subperiods within a period (P), said subperiods having assigned message meanings;

message correlating means at the sending stations for associating each of a plurality of message meanings to be transferred with respective ones of said discrete subperiods;

means for determining whether subperiods on the transmission medium are available for use;

storage means for holding the message meanings to be transmitted until subperiods corresponding to said held message meanings are available; and signal sending means, responsive to said message correlating means and said storage means, for inserting identifying signals into available selected subperiods having assigned message meanings correlated with said held message meanings;

whereby a receiving station may, in response to said identifying signals, derive the transferred message meanings corresponding to the subperiods having said identifying signals.

28. System as in claim 27, including:

means, at the receiving station, for detecting said identifying signals; and message correlating means, at said receiving station, responsive to said detecting means at said receiving station, responsive to said detecting means at said receiving station for associating each of the discrete subperiods in which said identifying signals are received with the assigned message meanings.

29. A system as in claim 28, in which said identifying signal identifies the sending or receiving stations.

30. A system as in claim 28, in which said identifying signal identifies the sending and the receiving stations.

31. System as in claim 27, including:

means for altering the correlation of the message meanings with the discrete subperiods so as to randomize the message meaning assignment for some of the stations, said assignment being the same for any two or more communicating stations.

32. System as in claim 27, including:

means, at the sending station, for shifting the insertion of the identifying signals from subperiods of proper message meanings to other subperiods; and means, at the receiving station, for restoring the proper message meanings.

33. A system as in claim 27, in which said identifying signal identifies one of the sending and receiving stations.

34. A system as in claim 27, in which said identifying signal identifies the sending and the receiving stations.

35. System as in claim 27, including:

modification signal generating means for producing signals which indicate control information;

and means for inserting modification signals into appropriate subperiods together with said identifying signals;

whereby the station receiving said identifying signals will also detect said modification signals and derive the control information corresponding thereto.

36. System as in claim 35, including:

modification signal detection means for detecting said modification bit signals; and modification signal transducing means associated with said modification signal detection means for deriving the control information from said modification signals.

37. A system for transferring messages from one to another of a plurality of stations in a communications network, comprising:

counter means for the stations for producing count numbers indicative of the occurrence of each of a multiplicity of discrete subperiods within a period (P), the counting being repeated for each period (P), the subperiods of each period (P) having assigned message meanings;

message correlating means at the sending stations for associating each of a plurality of message meanings to be transferred with respective ones of said discrete subperiods, and establishing message representative numbers indicative of each correlation;

storage means for storing the established message representative numbers;

comparator means for comparing the subperiod count numbers with the stored message representative numbers;

and signal sending means, responsive to said comparator means, for inserting identifying signals into the selected subperiods correlated with said message meanings;

whereby a receiving station may, in response to said identifying signals, derive the message meanings corresponding to said selected subperiods having said identifying signals.

38. System as recited in claim 37, wherein said signal sending means is responsive to a correlation of the message representative numbers and the subperiod count numbers.

39. System as recited in claim 37, wherein said identifying signal identifies the sending or the receiving station.

40. System as recited in claim 37, wherein said identifying signal identifies the sending and the receiving stations.

41. A system as in claim 37, including:

means at the sending stations for changing the numerical relationship between the count numbers of the counter means and the message representative number by a predetermined number to shift the insertion of the identifying signals from subperiods of proper message meanings to subperiods of different message meanings.

42. A system as in claim 41, in which the predetermined number is frequently changed in order to randomize the use of the discrete subperiods.

43. A system as in claim 37, including:

means at the sending stations for changing the numerical relationship between the count numbers and the message representative numbers by predetermined numbers to shift the insertion of the identifying signals from subperiods of proper message meanings to other subperiods;

and means at the receiving stations for restoring the proper message meanings.

44. A system as in claim 43, in which the predetermined numbers are frequently changed in order to make more uniform use of the discrete subperiods.

45. System as recited in claim 44, in which the predetermined numbers are periodically changed by means of a period sequence counter which counts each period (P) and produces period (P) count numbers for changing said predetermined number.

46. A system as in claim 37, including at the receiving stations, message correlating means comprising:

means for establishing message representative numbers from the subperiod count numbers of the subperiods in which the identifying signals are received, and associating the latter message representative numbers to message meanings.

47. A system as in claim 46, including:

means at the sending stations for inserting a predetermined number which alters the correlation between the message meanings and the subperiods whereby the insertions of the identifying signals are shifted from subperiods of proper message meanings to other subperiods;

and means at the receiving stations for restoring the proper message meanings.

48. A system as in claim 47, in which the predetermined number is frequently changed in order to randomize the use of the subperiods.

49. A system as in claim 37, including:
a transmission path; and
a plurality of send/receive units containing delay circuits interconnected along the transmission path, some of the plurality of stations being connected to each of the send/receive units.

50. A system as in claim 49, in which each send/receive unit comprises:
a READ section for recording received identifying signals in discrete subperiods and adapted for passage to receiving stations connected to the send-receive unit, the received identifying signals being received along the transmission path from a preceding send/receive unit;
and a WRITE section for recording identifying signals inserted by sending stations connected to the send/receive unit, the identifying signals recorded in the WRITE section being passed along the transmission path to following send/receive units.

51. A system as in claim 50, including:
a plurality of sending stations connected to the WRITE section of a send/receive unit;
and sending station selector means connected between the sending stations and the WRITE section for connecting the sending stations which are to pass identifying signals to the WRITE section.

52. A system as in claim 50, including:
means for preventing a sending station from inserting identifying signals in the WRITE section if it is already occupied by identifying signals.

53. A system as in claim 50, further including:
ternary to duobinary demodulators between the transmission path and the inputs of the READ sections;
and duobinary to ternary modulators between the outputs of the WRITE sections and the transmission path.

54. System as in claim 37, wherein the stations include a ternary to duobinary receiver, comprising:
detection means for receiving incoming identifying signals from the transmission line, said incoming signals consisting of in-phase sinusoidal signals, 180° of out-of-phase sinusoidal signals and zero-level direct current signals;
full-wave rectifying means connected to said detection means for rectifying said incoming signals;
an oscillator;
phase control means, connected to said full-wave rectifying means and said oscillator, for controlling the phase of said oscillator in accordance with the phase of said incoming line signals;
a phase inverter, connected to said detection means, for producing signals which are 180° out of phase with said detected incoming signals;
logic switching means, connected to receive said inphase incoming signals, said phase-inverted incoming signals, and said oscillator signals; said logic switching means designed to operate so that where the incoming line signal is an in-phase sinusoidal signal then a duobinary output representing a first means, where the incoming line signal is a 180° out of phase signal then a duobinary output representing a second condition will be produced, and where the incoming line signal is a zero-level direct current signal then a duobinary output representing a third condition will be produced;
whereby said duobinary signals are received and utilized by the stations.

55. System as in claim 37, wherein the stations include a duobinary to ternary transmitter, comprising:
an oscillator providing a carrier signal;
phase inverting means connected to said oscillator for producing signals 180° out of phase with said oscillator signals;
logic circuit means for receiving duobinary signals; and
switch means connected to the outputs of both said oscillator and said phase inverting means; said switch means connected to and operated by said logic circuit means so that for a first condition of said logic circuit means an in-phase carrier signal will be passed, for a second condition of said logic circuit means a 180° out of phase carrier signal will be passed, and for a third condition of said logic circuit means neither of said carrier signals will be passed;
whereby the signals passed by said switch means will be transmitted on the line.

56. System as in claim 55, wherein said oscillator is connected to a receiver circuit to set the oscillator in-phase with clock signals in said receiver circuit.

57. System as in claim 37, including at the sending stations:
buffer storage flip-flops for storing data signals representative of message meanings;
buffer entry gates connected to each of a series of rows of said buffer storage flip-flops to permit or deny entry of said data signals into said buffer storage flip-flops; and
shift enable means, connected to said buffer entry gates, to provide signals for shifting data from each row of buffer storage flip-flops to a lower adjacent row, respectively; said shift enable means including means for shifting data from the lowermost buffer row out of the buffer storage flip-flops for subsequent detection by said comparator means.

58. A system as in claim 37, including:
means at the receiving stations for detecting said identifying signals;
message correlating means at the receiving stations responsive to said detecting means for associating each of the discrete subperiods in which the so detected identification signals occurs with the message meanings;
means at one or more originator stations for initiating handshaking messages for the initiation and establishment of communications with one or more receptor stations; and
means at said receptor stations for receiving handshaking messages and for sending handshaking messages back to said originator stations.

59. A system for transferring messages from one to another of a plurality of stations in a communications network, comprising:
means for synchronizing the stations so that all may operate in synchronism with chronologically repetitive periods (P) of time;
counter means for the stations for producing count numbers indicative of each of a multiplicity of discrete subperiods within a period (P), the counting being repeated for each period (P), the subperiods of each period (P) being individually assigned message meanings;
message correlating means at the sending stations for associating a message meaning with a message representative number;
means at the sending stations for storing a message meaning or message representative number;
comparator means at the sending stations for comparing the subperiod count numbers of the counter means with the stored message meaning or message representative number;
means at the sending stations for determining whether said discrete subperiods are available for use;
signal sending means at the sending station, responsive to indication by the comparator means of a correlation of the stored message representative number or message meaning and a subperiod count number, for sending during the subperiod in which the identity occurs a signal identifying sending and/or receiving stations;
means at one or more stations for inserting into selected subperiods, handshaking messages for the initiation and establishment of communications between two or more communicating stations;

and means at one or more stations for inserting into selected subperiods, text messages for sending to one or more other stations.

60. System for transferring messages from one to another of a plurality of stations in a communications network having adapters for delivering signals to, or receiving signals from, a transmission line to each of a plurality of stations connected to said adapters, said system comprising:

synchronization means for indicating reference points in each of a series of periods (P), said synchronization means providing for recognition of each of a multiplicity of discrete subperiods within a period (P), said subperiods having individually assigned message meanings;

counting means, responsive to said synchronization means, for producing count numbers corresponding to each of said discrete subperiods;

means for establishing message representative numbers indicative of each message meaning to be sent, and for correlating each of said message representative numbers with respective ones of said discrete subperiods, said correlation not necessarily being in a one-to-one relationship wherein said message representative numbers are correlated with identical count numbers;

comparator means for comparing the subperiod count numbers with the message representative numbers;

means for determining whether subperiods are available for use; and signal sending means, responsive to indication by said comparator means of a correlation of the message representative number and a subperiod count number, for inserting in the available subperiod in which the identity occurs a signal identifying at least one of the receiving and/or sending stations.

61. System as in claim 60, including:

a select mechanism for sampling a plurality of stations for requests for sending signals in available subperiods;

said select mechanism connecting said comparator means for comparing the subperiod count numbers with each sending station's message representative number;

means for detecting available subperiods for sending signals; and gating means at each sending station for enabling identifying signals stored at respective stations to be inserted into subperiods by said signal sending means, said gating means responsive to said comparator means and said select mechanism;

whereby said comparator means and said detecting means indicates a correlation of the subperiod count number of an available subperiod and a message representative number, and said select mechanism indicates the particular station presenting said message representative number to enable the gating means of the selected station.

62. System as in claim 60, including at a receiving station:

means for detecting identifying signals received from the transmission line to determine the presence of information for one or more of the stations associated with said detecting means;

counting means, responsive to said synch means for producing count numbers corresponding to each of the subperiods received;

station selector means, responsive to said detecting means, for indicating to the particular receiving station identified by said signals the presence of information for such station;

whereby the receiving station may, in response to the signals from said station selector and said counting means, derive the message meanings corresponding to the subperiods having said identifying signals.

63. A method of transferring messages from one to another of a plurality of stations in a communications network, comprising:

assigning message meanings to respective ones of a multiplicity of discrete subperiods within each of one or more periods (P) on a transmission medium;

generating message meanings desired for transmission to one or more sending stations;

at one or more sending stations, comparing said message meanings with the available subperiods having assigned meanings corresponding to said message meanings, and determining which subperiods are available for use by a given sending station;

at one or more sending stations, inserting into a predetermined location within the selected available subperiods for sending along the transmission medium, signals identifying at least one of the receiving and/or sending stations;

at one or more receiving stations, detecting assigned station identifying signals on the transmission medium; and at one or more receiving stations, correlating the discrete subperiods in which said station identifying signals are detected with their respective assigned message meanings.

64. A system for transferring messages from one to another of a plurality of stations in a communications network, comprising, at the stations:

synchronization means for recognizing and indicating the occurrence of each of a multiplicity of discrete subperiods within a period (P), said subperiods being individually assigned message meanings;

message correlating means for associating each of a plurality of message meanings with respective ones of said discrete subperiods;

comparator means, at the sending stations, for comparing the message meanings to be transmitted with the subperiods corresponding to said message meanings and available for use on a transmission medium;

signal sending means, at the sending stations, responsive to said synchronization means and said comparator means, for inserting station identifying signals into available selected subperiods having assigned message meanings associated with said stored message meanings, said station identifying signals being inserted at a predetermined location within each of said selected subperiods;

whereby a receiving station may, in response to said identifying signals, derive the transferred message meanings corresponding to the discrete subperiods in which said identifying signals are received.

* * * * *

UNITED STATES PATENT OFFICE

CERTIFICATE OF CORRECTION

Patent No. 3,646,274 Dated February 29, 1972

Inventor(s) Mark T. Nadir, Warren and Carl N. Abramson, South ~~Boundbrook, both of New Jersey~~

It is certified that error appears in the above-identified patent and that said Letters Patent are hereby corrected as shown below:

At column 2, line 20, delete the word "sages".

At column 3, line 18, "send a plurality" should read --send from a plurality--.

At column 3, line 19, "stations a plurality" should read --stations to a plurality--.

At column 3, line 68, the word "means" should read --mean--.

At column 5, line 25, the symbols ")P)" should appear --(P)--.

At column 6, line 19, the word "cleat-- should be --clear--.

At column 7, line 25, "be wire" should read --be by wire--.

At column 7, line 32, "originator stations 1 and 2 shown," should read --originator stations at the originator end identical with originator stations 1 and 2 shown--.

At column 8, line 25, "the SI Originator Station" should read --the SI of Originator Station--.

At column 8, line 28, the word "to" should be --so--.

At column 8, line 47, "gate 100" should read --gate 10--.

[redacted]

UNITED STATES PATENT OFFICE

CERTIFICATE OF CORRECTION

Patent No. 3,646,274 Dated February 29, 1972

Inventor(s) Mark T. Nadir, Warren and Carl N. Abramson, South ~~Boundbrook, both of New Jersey~~

It is certified that error appears in the above-identified patent and that said Letters Patent are hereby corrected as shown below:

At column 2, line 20, delete the word "sages".

At column 3, line 18, "send a plurality" should read --send from a plurality--.

At column 3, line 19, "stations a plurality" should read --stations to a plurality--.

At column 3, line 68, the word "means" should read --mean--.

At column 5, line 25, the symbols ")P)" should appear --(P)--.

At column 6, line 19, the word "cleat-- should be --clear--.

At column 7, line 25, "be wire" should read --be by wire--.

At column 7, line 32, "originator stations 1 and 2 shown," should read --originator stations at the originator end identical with originator stations 1 and 2 shown--.

At column 8, line 25, "the SI Originator Station" should read --the SI of Originator Station--.

At column 8, line 28, the word "to" should be --so--.

At column 8, line 47, "gate 100" should read --gate 10--.

UNITED STATES PATENT OFFICE

CERTIFICATE OF CORRECTION

Patent No. 3,646,274 Dated February 29, 1972

Inventor(s) Mark T. Nadir, Warren and Carl N. Abramson, South Boundbrook, both of New Jersey It is certified that error appears in the above-identified patent and that said Letters Patent are hereby corrected as shown below:

At column 8, line 61, the word "by" should be --but--.

At column 9, line 41, the phrase "that series" should read --that a series--.

At column 9, line 70, "SIP counter 1" should read --SIP counter 18--.

At column 9, lines 72 and 73, delete the sentence "For example, at the beginning of the text SIP."

At column 11, line 24, "FIG. B" should be --FIG. 13--.

At column 14, line 39, "'0' signal" should read --"0" level signal--.

At column 17, line 10, the word "equipment" should be --equipments--.

At column 18, line 31, the word "SOPs" should be --SIPs--.

At column 18, line 34, the word "SIP" should be --start--.

UNITED STATES PATENT OFFICE

CERTIFICATE OF CORRECTION

Patent No. 3,646,274 Dated February 29, 1972

Inventor(s) Mark T. Nadir, Warren, and Carl N. Abramson, South ~~Boundbrook, both of New Jersey~~

It is certified that error appears in the above-identified patent and that said Letters Patent are hereby corrected as shown below:

At column 27, line 16, the word "which" should be --while--.

At column 27, line 28, the word "be" should be --by--.

At column 27, line 71, the word "known" should be --know--.

At column 30, line 53, the word "or" should be --and--.

At column 31, line 9, the number "542" should be --452--.

At column 31, line 42, the word "os" should be --of--.

At column 32, line 54, Claim 5, the word "transformed" should be --transferred--.

At column 35, lines 43-44, Claim 28, delete the phrase "responsive to said detecting means at said receiving station".

At column 37, line 28, Claim 51, the word "connecting" should be --selecting--.

Signed and sealed this 27th day of March 1973.

(SEAL)
Attest:

EDWARD M.FLETCHER,JR.
Attesting Officer

ROBERT GOTTSCHALK
Commissioner of Patents